United States Patent [19]
Ishiwata et al.

[11] Patent Number: 5,444,681
[45] Date of Patent: Aug. 22, 1995

[54] METHOD AND APPARATUS FOR RECORDING SIGNALS WITH SUB-SIGNALS INDICATIVE OF OUTLINE OF THE SIGNALS

[75] Inventors: Koji Ishiwata; Satoru Tobita, both of Kanagawa, Japan

[73] Assignee: Sony Corporation, Tokyo, Japan

[21] Appl. No.: 208,133

[22] Filed: Mar. 8, 1994

[30] Foreign Application Priority Data

Mar. 9, 1993 [JP] Japan .................. 5-076191

[51] Int. Cl.⁶ .................. G11B 17/22; G11B 7/00
[52] U.S. Cl. .................. 369/32; 369/47
[58] Field of Search .............. 369/47, 48, 32, 13, 369/54, 83, 84, 275.2, 59; 360/15, 13

[56] References Cited
U.S. PATENT DOCUMENTS 5,224,087  6/1993  Maeda et al. .................. 369/47
5,325,347  6/1994  Sako .................. 369/48
5,325,352  6/1994  Matsumoto .................. 369/83

*Primary Examiner*—Georgia Y. Epps
*Assistant Examiner*—Tan Dinh
*Attorney, Agent, or Firm*—Limbach & Limbach

[57] ABSTRACT

A disc recording/playback apparatus adapted to obtain data of recorded signals at the maximum level within a predetermined period in the signal recorded on an erasable medium per each predetermined period from a signal recording start point to end point and to record them as waveform data of the recorded signal in a different recording area from that of the recorded signal. A compressed envelope waveform of the recorded signal may be displayed on a display section by supplying the waveform data continuously to the display section, so that broad signal changes can be understood by viewing them.

10 Claims, 32 Drawing Sheets

Exemplary Cross Section of Disc

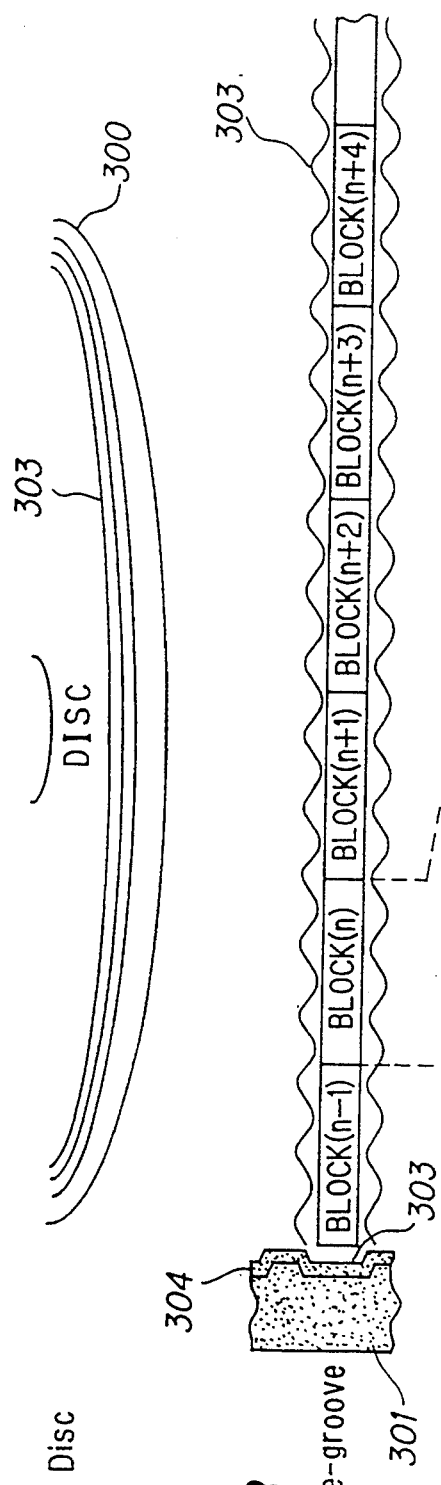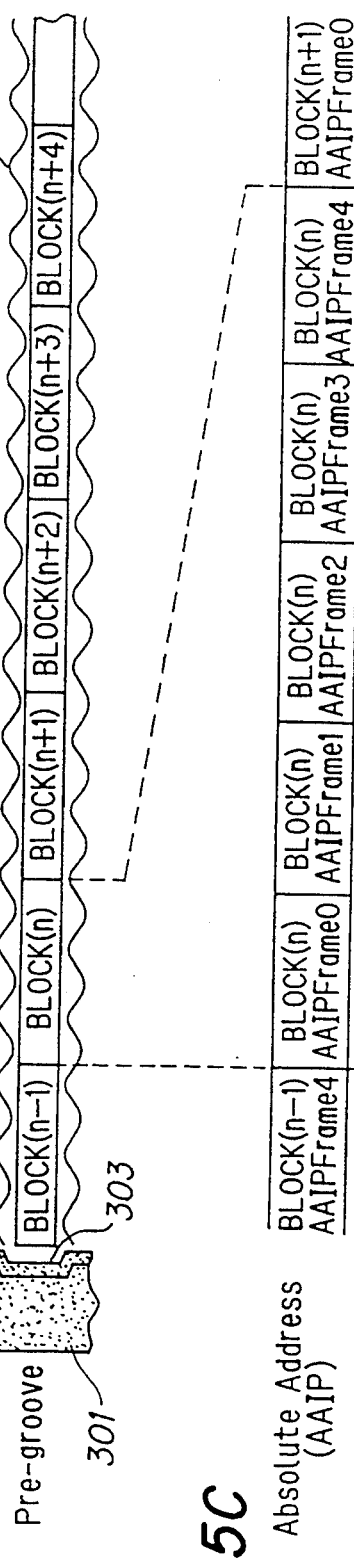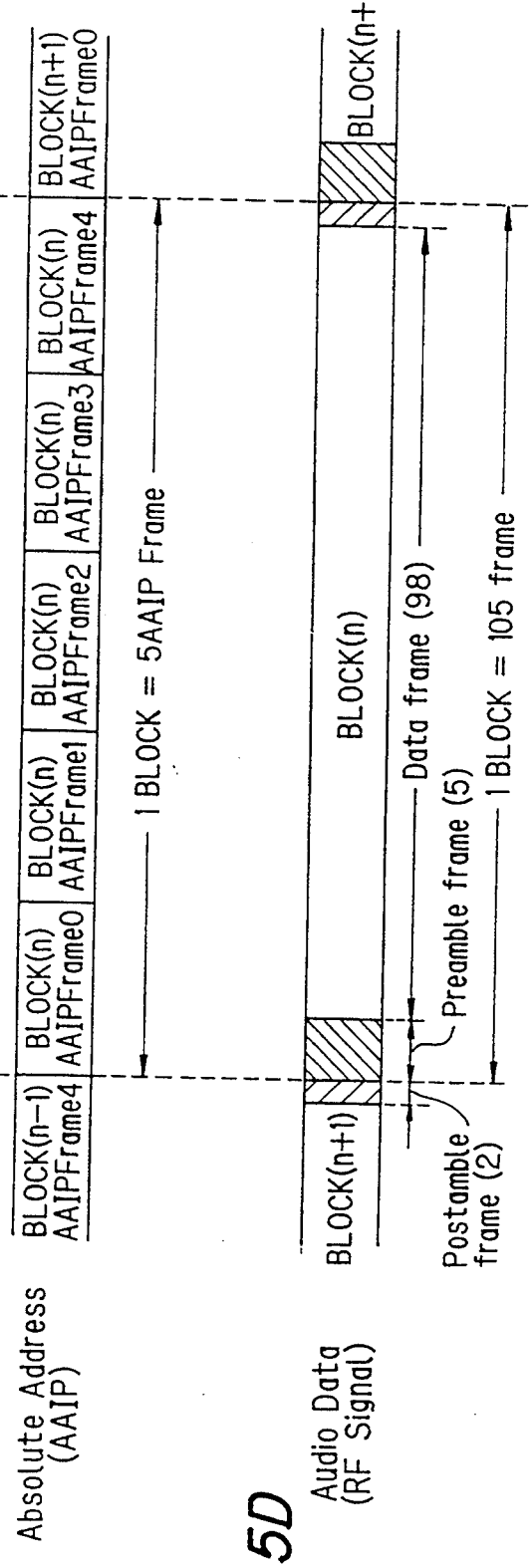
Fig. 5A Disc
Fig. 5B Pre-groove
Fig. 5C Absolute Address (AAIP)
Fig. 5D Audio Data (RF Signal)

Fig. 11

Example of Contents Recorded in Sub-Data Area (1) Record Management Information

- Disc Management Information
  Disc identification code (Disc ID)
  Recording method
  Sampling frequency, etc.
- Data Management Information
  Address table of used sub-area
  Edit data, etc.
- Recording State Management Information
  Start/Stop address
  mark location information, etc.

(2) Sub-Code Data Area
- Compact Disc Sub-Code Data
- Mini-Disc Sub-Code Data (3) Edit Data
- File Management Information
- Edit File
  Music list
  Music title, etc.
- Take list, etc.

(4) Waveform Data
  Waveform absolute value, etc.

Write Position on Disc

Program Reproduced

Faded

Program Reproduced

Program Reproduced

Pose   Fade

Original Audio Data

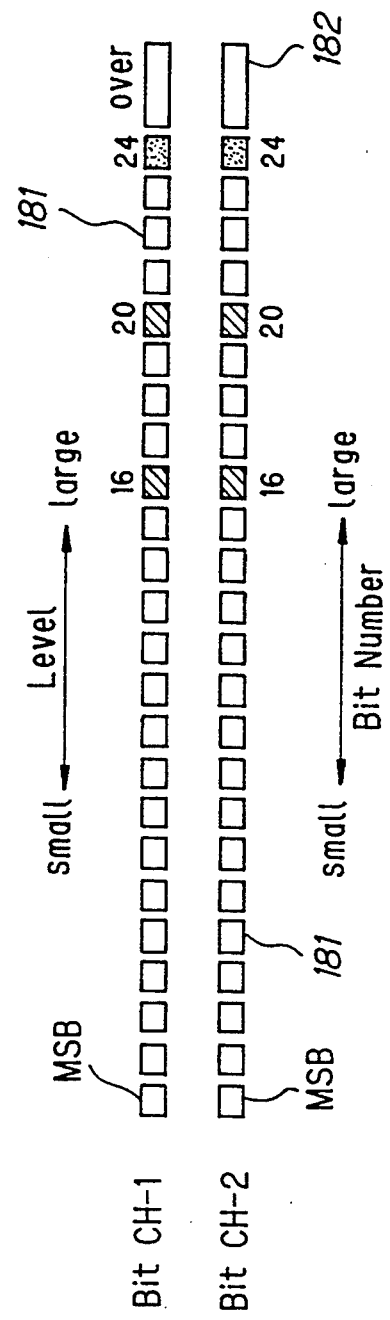

BLKWD

| 16Bit | 20Bit | 24Bit |
|---|---|---|
| 1470 | 1176 | 980 |

Fig. 29

TCWD

| Sampling Freq. | TC Format | | | |
|---|---|---|---|---|
| | SMPTE 30Hz | SMPTE 29.97Hz | EBU 25Hz | FILM 24Hz |
| 48KHz | 1600 | 1601.6 | 1920 | 2000 |
| 44.1KHz | 1470 | 1471.47 | 1764 | 1837.5 |
| 44.056KHz | 1468.531 | 1470 | 1762.238 | 1835.664 |

Fig.33

Edit Data

| Editing point | Starting point | Ending point |
|---|---|---|
| E 1 | I 1 | O 1 |
| E 2 | I 2 | O 2 |
| E 3 | I 3 | O 3 |
| E 4 | I 4 | O 4 |
| E 5 | I 5 | O 5 |
| E 6 | I 6 | O 6 |
| · | · | · |
| · | · | · |
| · | · | · |

E ⟶ (E 4)

METHOD AND APPARATUS FOR RECORDING SIGNALS WITH SUB-SIGNALS INDICATIVE OF OUTLINE OF THE SIGNALS

BACKGROUND OF THE INVENTION

1. Field of the Invention

The present invention relates to a disc recording/playback apparatus suitably applied to a master disc unit for producing a cutting master disc which is an original disc used for manufacturing a large number of compact discs (CD) and mini-discs (MD) in a music disc manufacturing factory and more particularly to a disc recording/playback apparatus adapted to be able to display a compressed envelope waveform of music signal to be recorded.

2. Description of the Related Art

A recording medium for a cutting master which is an original disc of compact discs and mini-discs has to be provided in manufacturing a large number of compact discs and mini-discs in a music disc manufacturing factory. Normally a magnetic tape is used for this recording medium. FIG. 36 is a system block diagram of a main part of a prior art master recording apparatus 10 used for creating the original disc.

In FIG. 36, normally a digital video tape recorder (U-matic video tape recorder) is used in a multi-channel tape recorder 11 in which source music signals are recorded to create an original audio tape in which the music signals are recorded. Because the original audio tape is multi-channel recorded, a master recorder 12 converts it into two channel signals.

A master tape is then supplied to an editing unit 13 to implement editing operations necessary for convertion into a format conforming to the type of disc to be cut to create a final master tape for cutting. All disc manufacturing factories produce corresponding compact discs and cassette tapes using this master tape.

Incidentally, with the recent spread of music discs, the demand for using discs as recording mediums for original discs has strengthened. By using the disc as an original, original signals can be recorded linearly without compressing them and edited on one original disc without destroying them, making the disc an original.

In using the disc as the original instead of the tape described above, it is helpful in editing operations, such as determining editing points, if broad envelope changes of music signals recorded in the disc can be grasped when carrying out editing operations using the disc.

SUMMARY OF THE INVENTION

Accordingly, it is an object of the present invention to provide a disc recording/reproducing apparatus adapted to facilitate capturing a recorded signal by recording a compressed envelope waveform of the signal recorded in the disc in a different area from that of the recorded signal.

In order to solve the aforementioned problem, a disc recording/playback apparatus of the present invention is adapted to obtain data of a maximum level recorded signal within a predetermined period in the signal recorded on an erasable medium per each predetermined period from a signal recording start time to end time, and to record the data as waveform data of the recorded signal in a different recording area from that of the recorded signal.

For example, as shown in FIG. 14A, wherein audio data is shown as analog, data of a maximum level recorded signal within a predetermined period T is obtained in the signal recorded on the erasable disc per each predetermined period from the signal recording start time to end time and they are recorded as waveform data (FIG. 14B) of the recorded signal in a different recording area from that of the recorded signal.

A compressed envelope waveform (FIG. 14B) of the recorded signal may be displayed on a display section by supplying the waveform data continuously to the display section, so that broad signal changes can be understood by viewing them.

The above and other advantages of the present invention will become more apparent in the following description and the accompanying drawings, in which like numerals refer to like parts.

BRIEF DESCRIPTION OF THE DRAWINGS

FIG. 5A-D are diagrams showing a relationship between absolute addresses and data;

FIG. 11 is a table showing one example of contents recorded in a sub-data area;

FIG. 15 is an explanatory diagram showing a data bit display example;

FIG. 25 is a flowchart showing an exemplary process for recording edit data and the like;

FIG. 26 is flowchart showing another exemplary process for recording edit data and the like;

FIG. 29 is another diagram for explaining the conversion to time codes;

FIG. 33 is a diagram for explaining the edit data used in the optimizing process;

DETAILED DESCRIPTION OF PREFERRED EMBODIMENT

Figure 1:
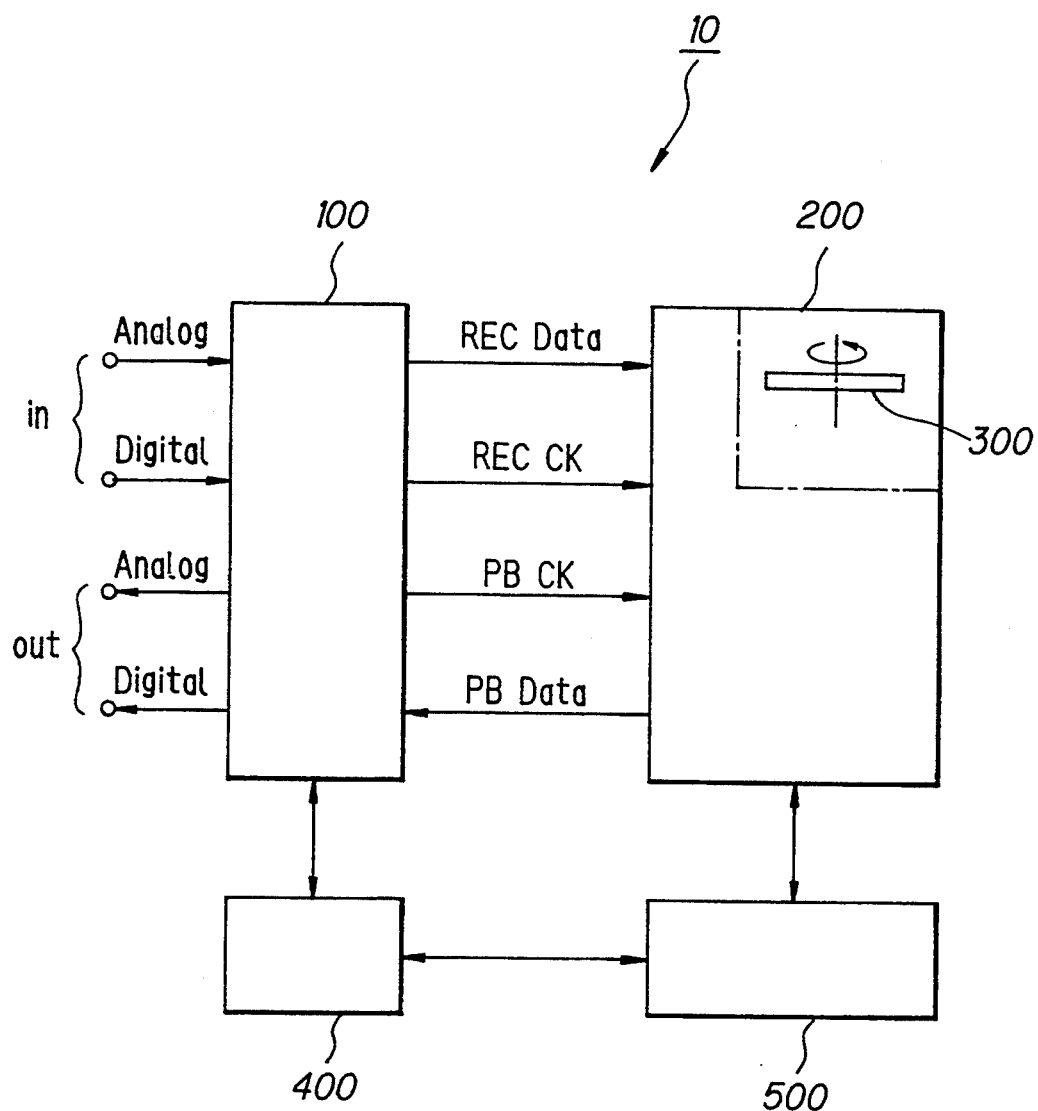
FIG. 1 is a system diagram showing the main parts of a master recording apparatus.

Referring now to the drawings, a preferred embodiment of a disc recording/playback apparatus of the present invention will be explained in detail concerning a case when it is applied to the master recording apparatus described above.

FIG. 1 is a system diagram showing an outline of a master recording apparatus 10 wherein original audio signals are input to a signal processor 100 and audio data (REC data) and the like processed according to their purpose are supplied to a recording/playback processing system 200 in the next stage to be recorded on a disc 300 provided therein.

The disc 300 is an erasable disc and serves as an original disc, i.e. a master disc for cutting. Audio data recorded in the disc 300 may be edited without being destroyed. This will be described later in detail.

A main control section (main CPU) 400 controls the signal processor 100 and another control section (CPU) 500 controls the recording/playback processing system 200. Because the CPU 500 mainly controls the servo system of the disc 300, it will be referred to as a servo CPU hereinafter. The main CPU 400 and servo CPU 500 are adapted to operate synchronously with each other by being linked through a SCSI interface.

Figure 2:
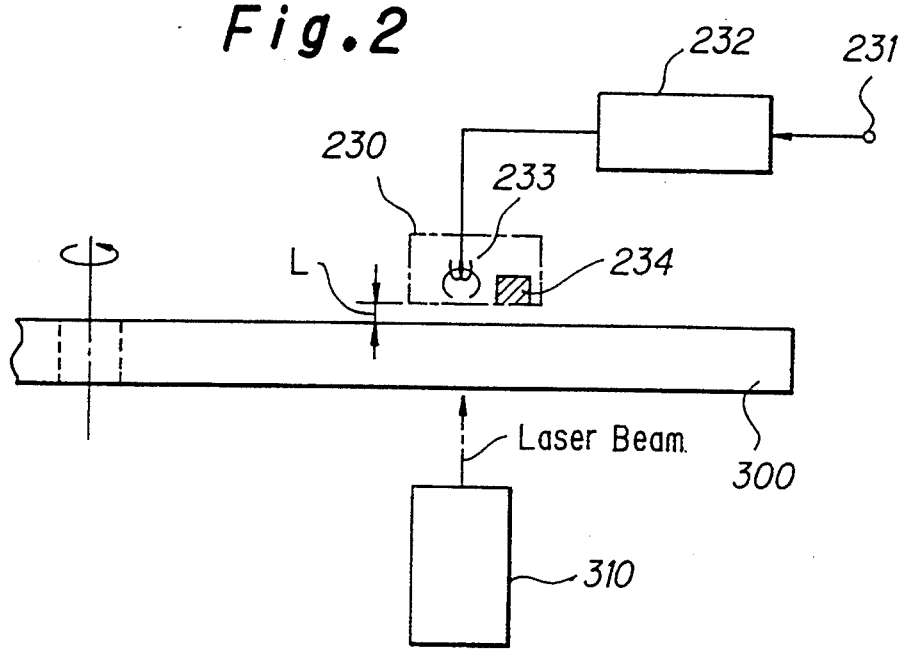
FIG. 2 is a drawing showing an outline of a pickup system and head system.

FIG. 2 shows an outline of a system for recording/reproducing audio data to/from the disc 300 for which a magneto-optical disc (MO disc), described later, is used. A light pick-up unit 310 utilizing a laser beam is provided on one side of the disc 300 and a magnetic head unit 230 forming a recording system is provided on the other side thereof. The erasable disc need not be confined to a magneto-optical disc.

Digitized audio data (including data accompanying the audio data described later) is supplied to a terminal 231. It is then supplied to a magnetic head 233 via a head driver 232 to write the audio data in cooperation with the light pick-up unit 310.

A gap sensor 234 is provided within the magnetic head unit 230 to be able to scan the disc 300 without coming into contact therewith. The gap sensor 234 and the disc 300 are arranged so that they form a pair of electrodes, and the magnetic head unit 230 is controlled so that a gap L therebetween is kept constant based on changes of electrostatic capacity detected by the gap sensor.

Figure 3:
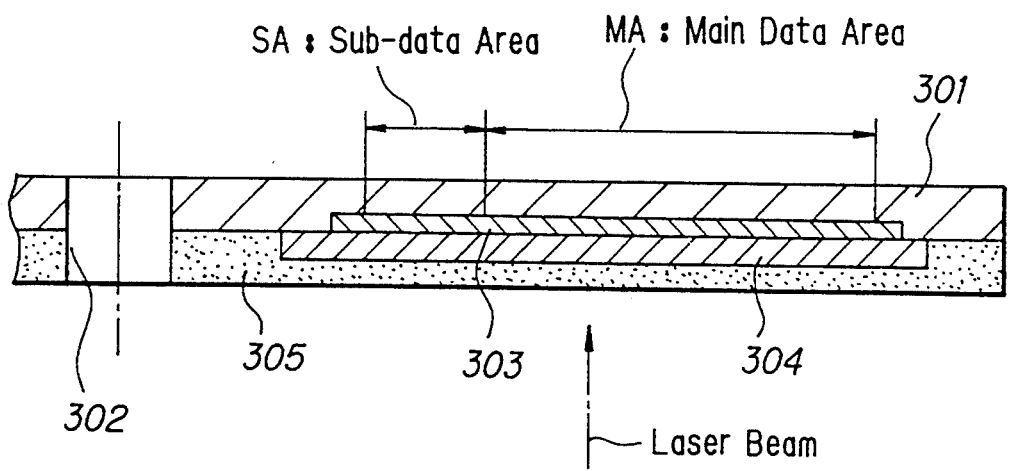
FIG. 3 is a section view of a disc.
Figure 4:
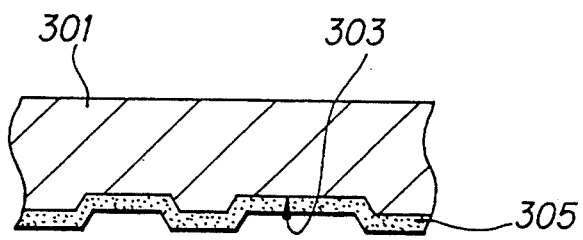
FIG. 4 is a section view of part of a disc.

The disc 300 utilizes the structure shown in FIG. 3. As shown in FIG. 4 in detail, pre-grooves (guide grooves) 303 wobbled by FM-modulating absolute addresses are formed across a predetermined area at a predetermined position under a disc substrate (disc) 301 and a magneto-optical film (MO film) having a much larger area than that of the pre-grooves 303 is coated so as to cover the surface of the pre-grooves 303. The reference numeral 302 denotes a hole for chucking.

As is well known, the magneto-optical film 304 is magnetized in the direction of an external magnetic field applied thereon when a specific point is heated to more than a predetermined temperature. The heating up to more than the predetermined temperature is realized by radiating a laser beam, the power of the laser being controlled so that it is stronger when writing audio data than when reading it. The surface of the magneto-optical film 304 is covered by a protection film 305.

With reference to FIGS. 5A through 5D, absolute addresses (AAIP) pre-striped in the pre-grooves 303 will be explained. The absolute addresses are FM-modulated and recorded in the pre-grooves 303 in block units as shown in FIG. 5B. The absolute address is a pre-mastered address. The same address data is repeated 5 times and recorded in one block as shown in FIG. 5C.

One block of audio data is defined as having the same length as one block of the absolute address, as shown in FIG. 5D, and 105 frame data are stored in one block. Among 105 frames, 98 frames are frames for audio data and 5 fames of preamble area are held at the front portion of the block while 2 frames of postamble area are held at the rear portion of the block.

The absolute addresses affixed to a main data area MA are recorded so that their frame numbers progress in the direction from the inner periphery side to the outer periphery side of the disc, and the absolute addresses affixed to a sub-data area SA are recorded so that their numbers progress in the direction from the outer periphery side to the inner periphery side thereof.

Figure 6:
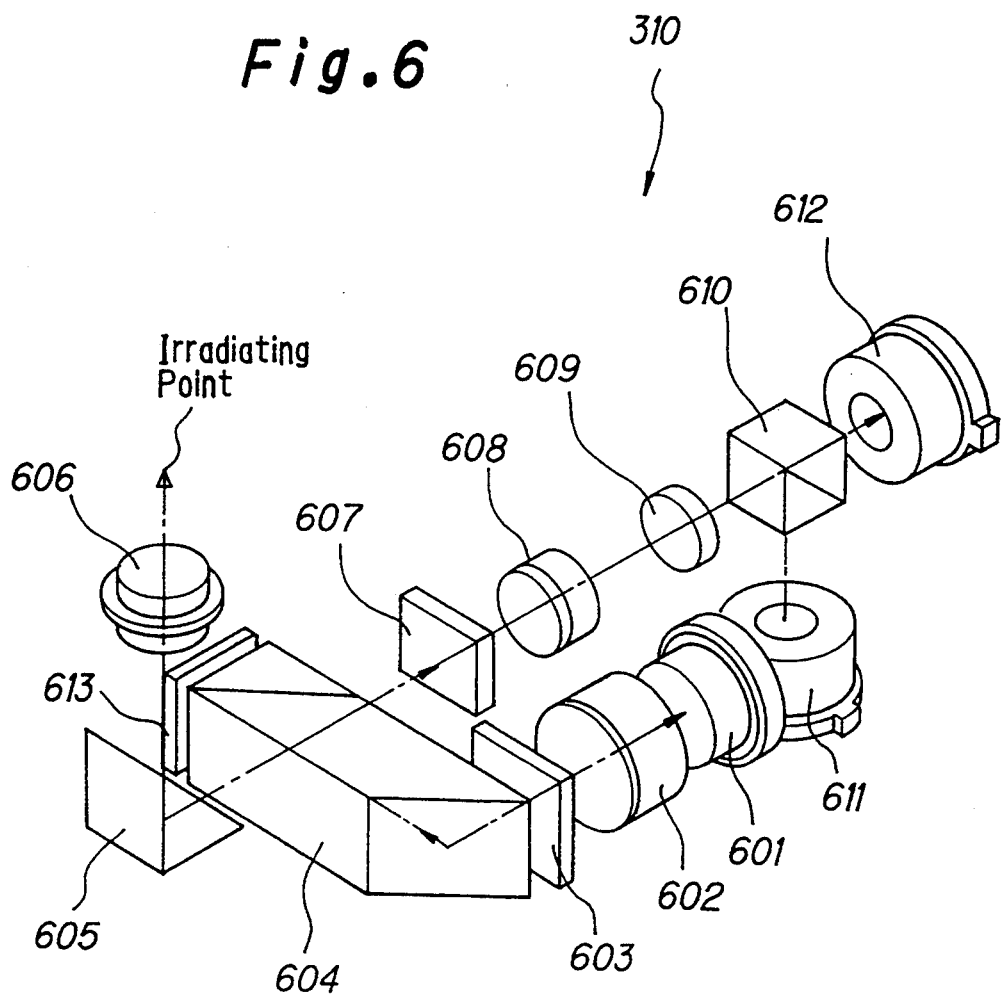
FIG. 6 is a perspective view showing a main part of concrete example of a light pick-up unit.

The light pick-up unit 310 for reading the audio data is constructed as shown in FIG. 6. A light pick-up unit used in practice in the light pick-up system of compact disc players and the like may be appropriated for use in the major part of the light pick-up unit 310.

Laser light (laser beam) obtained from a laser beam source 601 through a collimator lens 602 is diffracted by a grating 603 to be divided into a plurality of laser beams. It is divided into at least three beams in this example to extract signals, to detect tracking errors and to control focus. The divided laser beams are radiated onto the disc 300 through a beam splitter 604, phase mirror 605 and objective lens 606.

The laser beam (return beam) reflected from the disc 300 is input to the beam splitter 604. The laser beam transmitted through the beam splitter 604 is then input to a beam splitter 610 through a half wave plate 607, converging lens 608 and multi-lens 609. The laser beam reflected by the beam splitter 610 is image-formed on a first optical detecting element 611 and the laser beam transmitted through the beam splitter 610 is image-formed on a second optical detecting element 612.

The first and second optical detecting elements 611 and 612 may be composed of a plurality of detecting elements whose optical detecting surfaces are divided into a plurality of parts, and the output obtained from each is added/subtracted to detect audio data (RF signals), tracking errors and focus errors.

A photo detector 613 provided at the end surface of the beam splitter 604 serves as a means for detecting a quantity of light for APC for automatically controlling the power of the laser light source 601.

Figure 7:
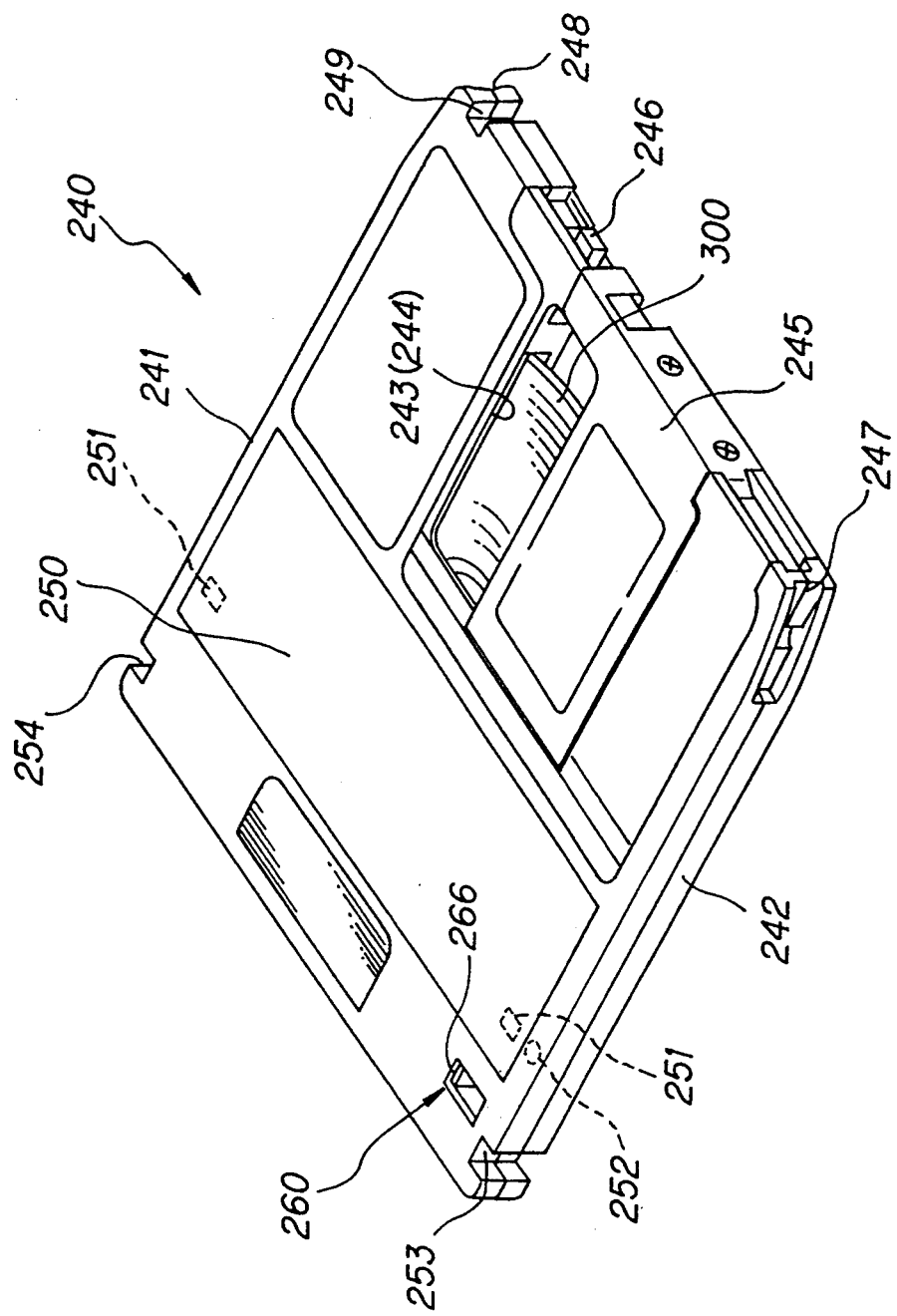
FIG. 7 is a perspective view showing one example of a disc storing case.

The erasable disc 300 is used in a state where it is stored in a flat case similarly to a compact disc or the like. FIG. 7 is a perspective view of a disc storing case 240 which is one example of the above flat case.

As seen in FIG. 7, the storing case 240 is composed of a flat upper case 241 and lower case 242. Window holes 243 and 244 having a predetermined size are created at a predetermined position of the upper and lower surfaces of the cases in a state when they are combined. Normally a shutter 245 is closed to protect the disc 300 stored inside from dust and the like. The shutter 245 is opened as shown in FIG. 7 when audio data is recorded or reproduced. The lock of the shutter 245 is released by a releasing projection attached at a concave portion 246 created at the front of the case. The lock is released when the case is loaded into a main body of the apparatus (an explanation of this function is omitted here since a conventional mechanism is appropriated for the purpose).

Channels 247 and 248 created at the front portion of the sides of the case are channels for guiding the case during loading. A concave section 249 provided at an edge portion of the front of the case serves as a means for preventing the case from being erroneously inserted. It facilitates discrimination of a 5.25 inch size MO disc, often used for saving data for computers. In order to prevent it from being erroneously inserted, the storing case is designed to have a size larger than that of existing MO discs.

One surface of the upper case 241 is provided as a label area 250. The reference numeral 251 denotes a hole (reference hole) for positioning the created case through the lower case 242, and 252 denotes a hole for detecting the type of created disc similarly through the lower case 242. The disc type may be accommodated to types of cutting master discs or to types of discs such as read only, write-once or erasable discs.

Concave portions 253 and 254 having respective predetermined widths are provided at the rear portion of the sides of the case to use as engaging concave portions for carrying the loaded case to another location.

Erroneous erase prevention means 260 is provided at the side of the rear portion of the case. Because the main data area MA and sub-data area SA are in the programmable area of the disc 300 described above and data may be recorded into each area, the erroneous erase prevention means 260 must be devised to be able to prevent erroneous erasure in any area.

The erroneous erase prevention means 260 may be switched among three stages. The first stage is a mode by which data can be freely rewritten in both the main data area MA and sub-data area SA.

The second stage is a mode by which erroneous erasure of the main data area MA is prevented. Accordingly, the sub-data area SA may be freely rewritten in this second stage. The third stage is a mode by which erroneous erasure is also prevented in the sub-data area SA as well as the main data area MA.

Data in the programmable area may be securely protected according to the purpose of the user by preventing erroneous erasure by dividing it thus into three stages. In order to achieve such stepwise prevention of erroneous erasure, the erroneous erase prevention means 260 is constructed as shown in FIGS. 8, 9 and 10.

Figure 8:
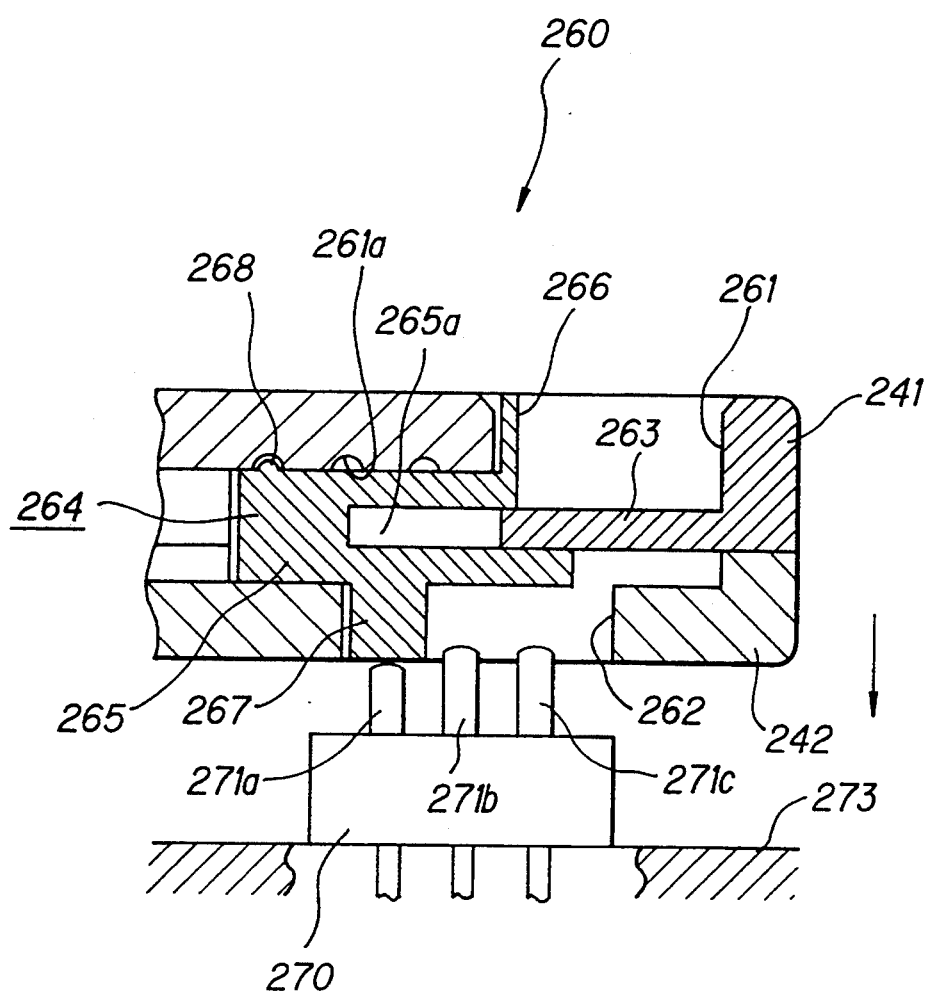
FIG. 8 is a section view of a main part of an erroneous erase prevention means.
Figure 9:
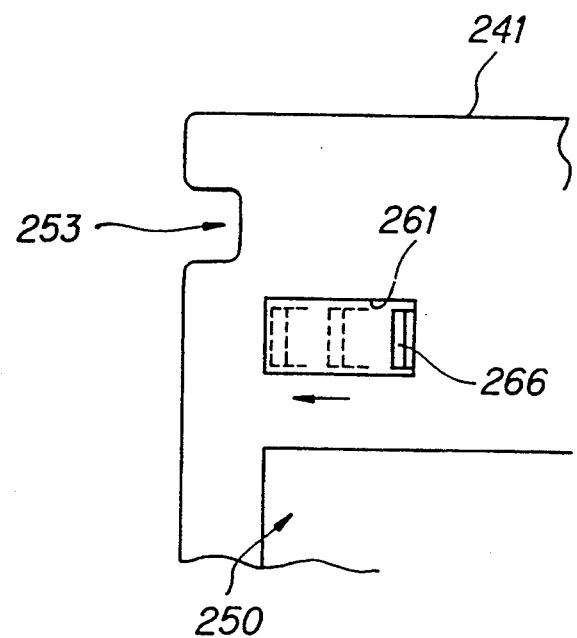
FIG. 9 is a plan view showing one example of the erroneous erase prevention means.
Figure 10:
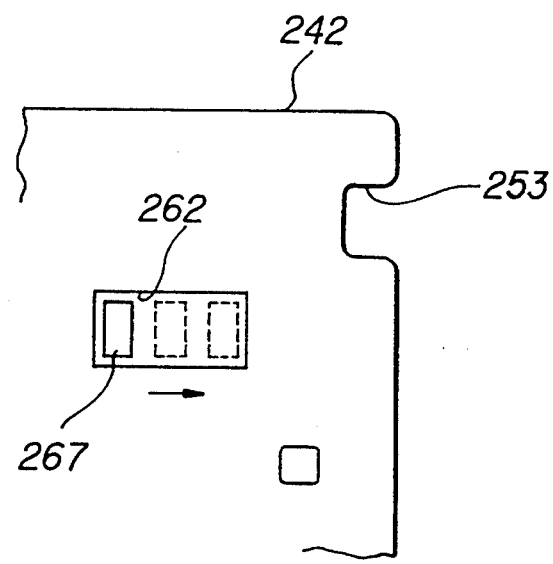
FIG. 10 is a rear view of the erroneous erase prevention means in FIG. 9.

FIG. 8 is a section view of the erroneous erase prevention means, FIG. 9 is a plan view of the erroneous erase prevention means seen from the surface of the disc and FIG. 10 is a rear view of the erroneous erase prevention means seen from the rear of the disc.

In the erroneous erase prevention means 260, a slide hole 261 (see FIG. 9) having a predetermined width is perforated on the upper case 241 as shown in FIG. 8 and a slide hole 262 having a predetermined width is perforated also through the lower case 242 at a position substantially inward from the hole 261. A guide plate 263 is provided so as to project inward from the upper case 241 as shown in FIG. 8 to allow an erroneous erase prevention claw 264 to slide along the guide plate 263.

The erroneous erase prevention claw 264 has a main body 265 having a slide concave portion 265a which accommodates the guide plate 263. A positioning piece 266 is provided at the upper end portion of the main body 265 so as to project upward and a detecting projection 267 is provided at the lower end portion thereof so as to project downward. In this example, the detecting projection 267 is positioned toward the inside of the case by a predetermined length from the positioning piece 266. A projection 268 secures the slide position of the main body 265 at three positions and corresponding concave portions 261a are provided at the three corresponding positions of the upper case 241.

A detecting sensor 270 is mounted and secured on a board 273 of the main body of the apparatus so that it faces the slide hole 262. The detecting sensor 270 is provided with three detectors 271a, 271b and 271c, as will be described later, to be able to detect the slide position of the erroneous erase prevention claw 264 from states of abutment of those detectors.

In the changeover state in FIG. 8, the positioning piece 266 is located at the position shown in FIG. 9 when seen from the upper surface of the disc and the detecting projection 267 is located at this time at the position shown in FIG. 10 seen from the back of the disc. This changeover state shall be defined as a first change-over state. In FIG. 9, a second changeover state is brought about when the positioning piece 266 is moved toward the left by one step, and a third changeover step is brought about when it is moved further toward the left by one step.

The detected output of the detecting sensor 270 shown in FIG. 8 is supplied to the servo CPU 500 to generate a record inhibiting signal corresponding to the detected output and to thereby control the magnetic head unit 230 and light pick-up unit 310 to be set in the erroneous erase prevention mode corresponding to each of the changeover steps.

While the area of the magneto-optical film 304 is the data recording area (program area), a given area from the outer periphery to the inner periphery in the program area is secured as the main data area MA and a given area further inside from the main data area MA is secured as the sub-data area SA.

Audio data per se is recorded in the main data area MA and disc management information and the like as well as data accompanying the recorded audio data is recorded in the sub-data area SA. FIG. 11 shows typical data recorded in the sub-data area. Among those data, a disc identification code (disc ID) is an identification code unique to the disc itself. An explanation of waveform data will be made later.

Figure 12:
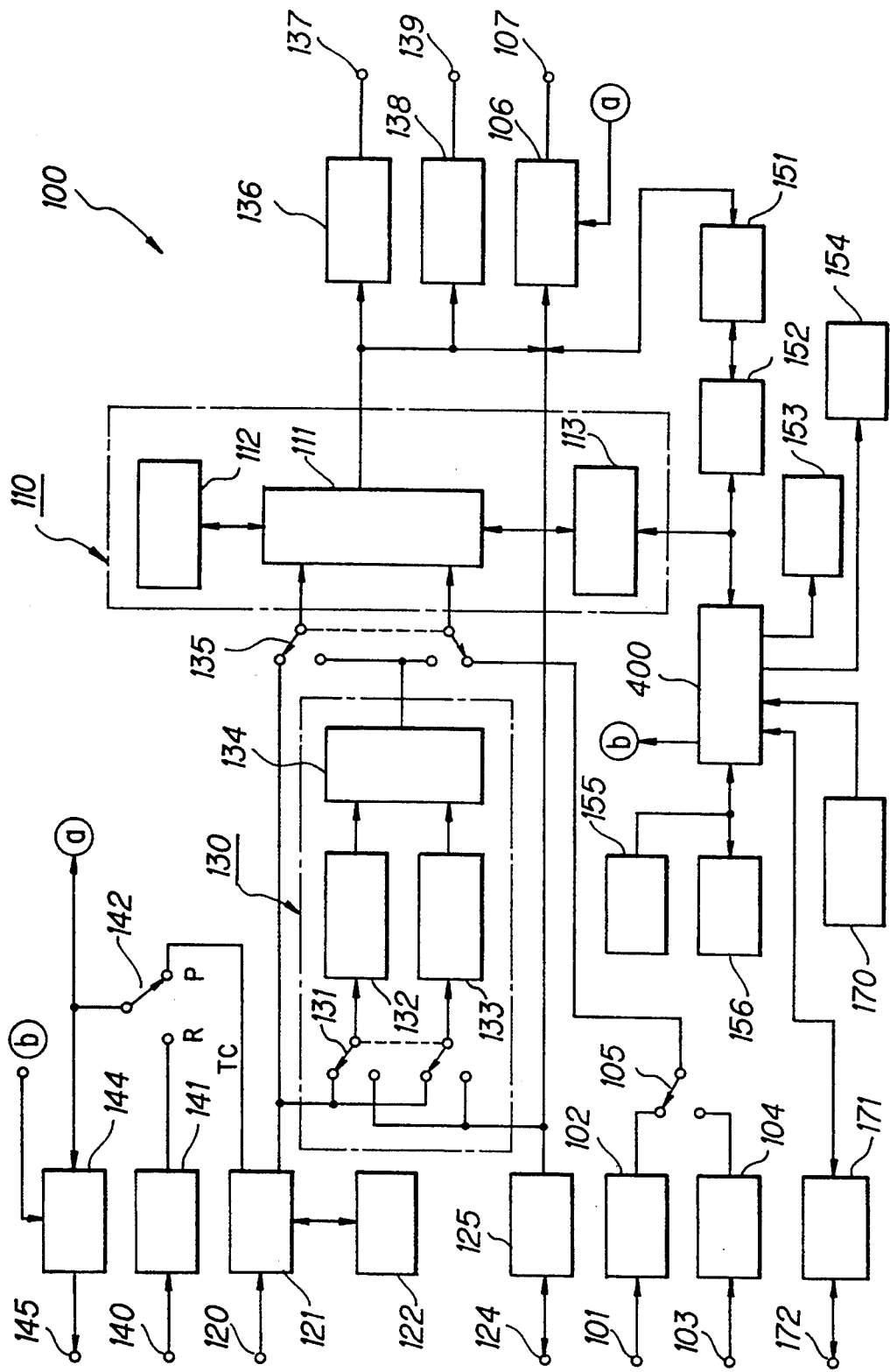
FIG. 12 is a system diagram showing one example of a signal processor used in a disc recording unit.

FIG. 12 shows an embodiment of the signal processor 100. An analog audio signal is supplied to a terminal 101 and is converted into a digital signal in an A/D converter 102. A digital audio signal is supplied to a terminal 103 and is supplied to a digital interface circuit 104. Either input of the digitized audio signals is selected by a switch 105 and is then supplied to a fade control circuit (cross-fader) 110.

The fade control circuit 110 is a processing system for realizing cross-fading such as fade-in and fade-out of audio signals and comprises a digital signal processor (DSP) 111, temporary RAM 112 for the cross-fade process and RAM 113 for sub-data for temporary storing cross-fade processing information.

The cross-faded digital audio signal is output to an output terminal 107 via an encoder 106 and is supplied to the magnetic head unit 230 as audio data.

Audio data read out by the light pick-up unit 310 is supplied to an input terminal 120 via the recording/playback processing system 200. A decoder 121 decodes the audio data and an error correcting process is performed on the data using a temporary RAM 122. After undergoing this process, the audio data is supplied to the fade control circuit 110 or to another fade control circuit 130 for reproducing programs in the case of reproducing a program.

The fade control circuit 130 comprises an input changeover switch 131, and pair of buffer memories 132 and 133 and DSP 134. The changeover switch 131 selects either the output of the decoder 121 or audio data from another unit supplied to a SCSI communication interface 125 from an input terminal 124.

Figure 13A:
FIGS. 13A, 13B, 13C and 13D are explanatory diagrams of program reproducing modes.
Figure 13B:
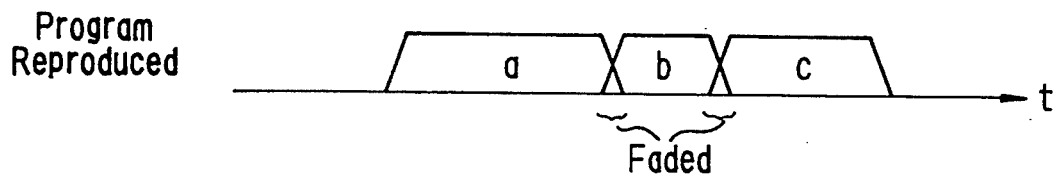
Figure 13C:
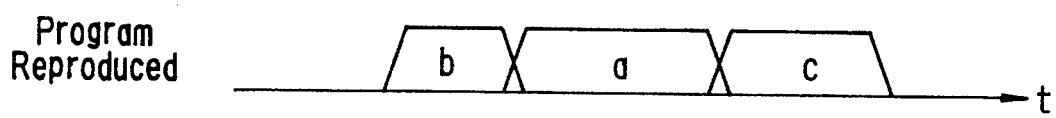
Figure 13D:
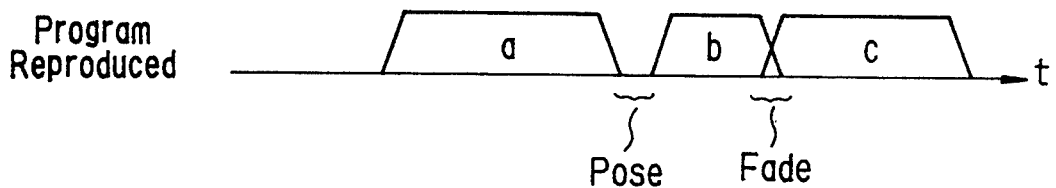

The fade control circuit 130 is designed to allow cross-fading of random audio data a, b and c on the disc 300 as shown in FIG. 13A, for example, in a state programmed as shown in FIGS. 13B or 13C. At this time, an appropriate pause period may be inserted between the audio data as shown in FIG. 13D. The pause period may be fixed or controlled by the user.

The program-reproduced audio data after the cross-fade process is input to the fade control circuit 110 via a changeover switch 135. The fade control circuit 110 is controlled so that it is in a simple through state in the case of program-reproduced audio data.

The output thereof is converted into an analog signal by a D/A converter 136 and is directed to a terminal 137 or a terminal 139 in its digital signal state directly through a digital interface circuit 138.

A terminal 140 is an input terminal of time codes TC supplied as necessary. When a time code TC is input thereto, it is directed to the encoder 106 via an interface circuit 141 and changeover switch 142 and is recorded in the main data area MA together with the audio data. The time code TC output from the decoder 121 is output to an external terminal 145 via the change-over switch 142 and interface circuit 144.

The main CPU 400 controls various signal processings necessary in the signal processor 100 such as the cross-fade process described above and also controls a waveform data processing circuit 151. The waveform data processing circuit 151 has a waveform editing function by which audio data is sampled at predetermined intervals to accumulate waveform data. A RAM 152 is a temporary RAM used at such a time. The waveform data accumulated in the RAM 152 is also stored in a RAM for sub-data 113.

Figure 14A:
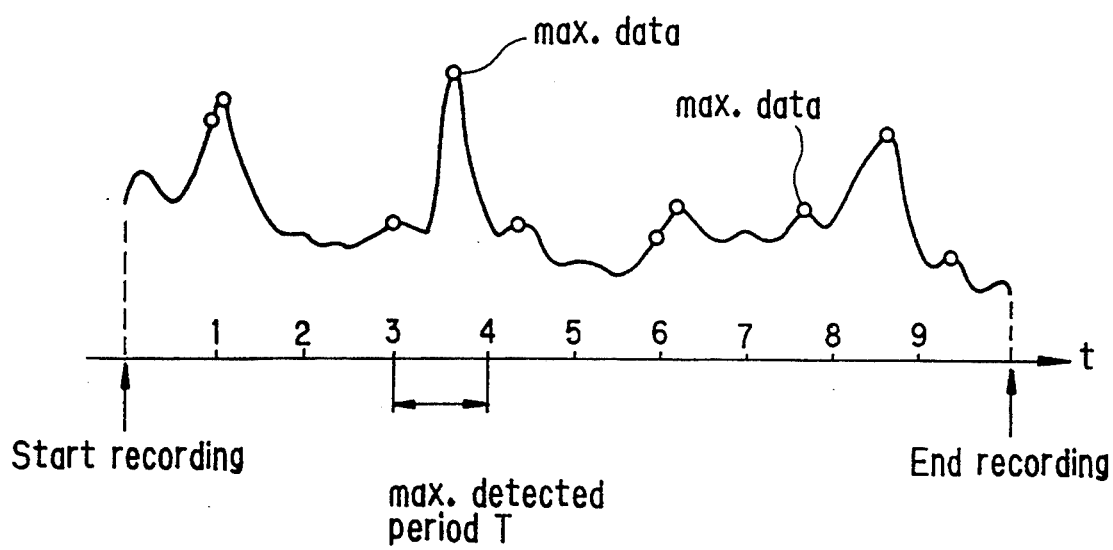
FIG. 14A is an explanatory diagram showing sampled waveform data.
Figure 14B:
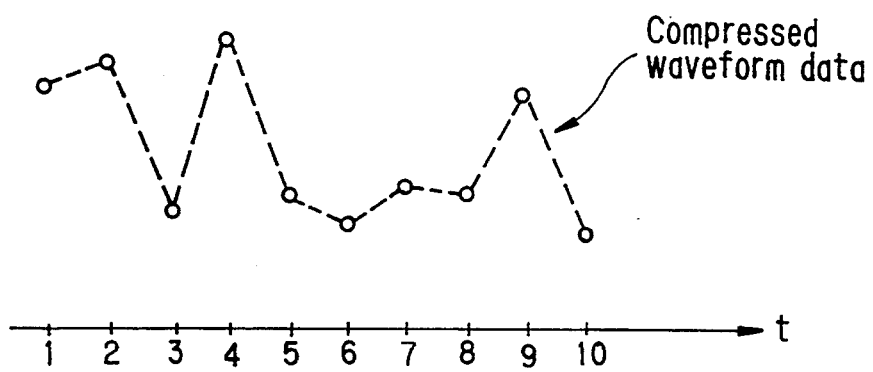
FIG. 14B is an explanatory diagram showing a recording example of the waveform data.

FIGS. 14A and 14B show examples of edited waveform data. As shown in the figures, maximum values of the original audio data is obtained within a predetermined period T and accumulated from the start to end of recording to be recorded in the sub-data area SA as waveform data.

It is possible to roughly grasp what kind of audio data is recorded by continuously observing the waveform data. The waveform data may be displayed on a display section 153 by reading them out from the RAM for sub-data 113 after recording the audio data and supplying it to the display section 153. Moreover, because it may be reproduced from the sub-data area of the disc 300 at any time, the reproduced waveform data may be displayed at any time by storing it in the RAM for sub-data 113 and supplying it to the display section 153.

A level indicating section as shown in FIG. 15 is provided in part of the display section 153. The level indicating section is adapted to be able to indicate two channels, each of which is composed of a plurality of display elements 181 (24 display elements in this example) arranged linearly. A display element 182 indicates an over-level.

24 display elements 181 are used to enable the level indicating section 180 to display even the maximum quantized number of bits of input audio data. This is because the quantized number of bits differs as 24 bits, 20 bits and 16 bits depending on sampling frequencies used, because three kinds of sampling frequencies (48 KHz, 44.1 KHz and 44.056 KHz) used in sampling are provided.

The display elements 181 and bit are related such that the left portion of the display elements indicates a MSB and the right portion elements display lower bits. The 16 th display element will indicate a LSB when the quantized number of bits is 16 bits and in the same manner, the 20 th element will indicate a LSB when the number is 20 bits and the 24 th element will indicate a LSB when the number is 24 bits.

Figure 16:
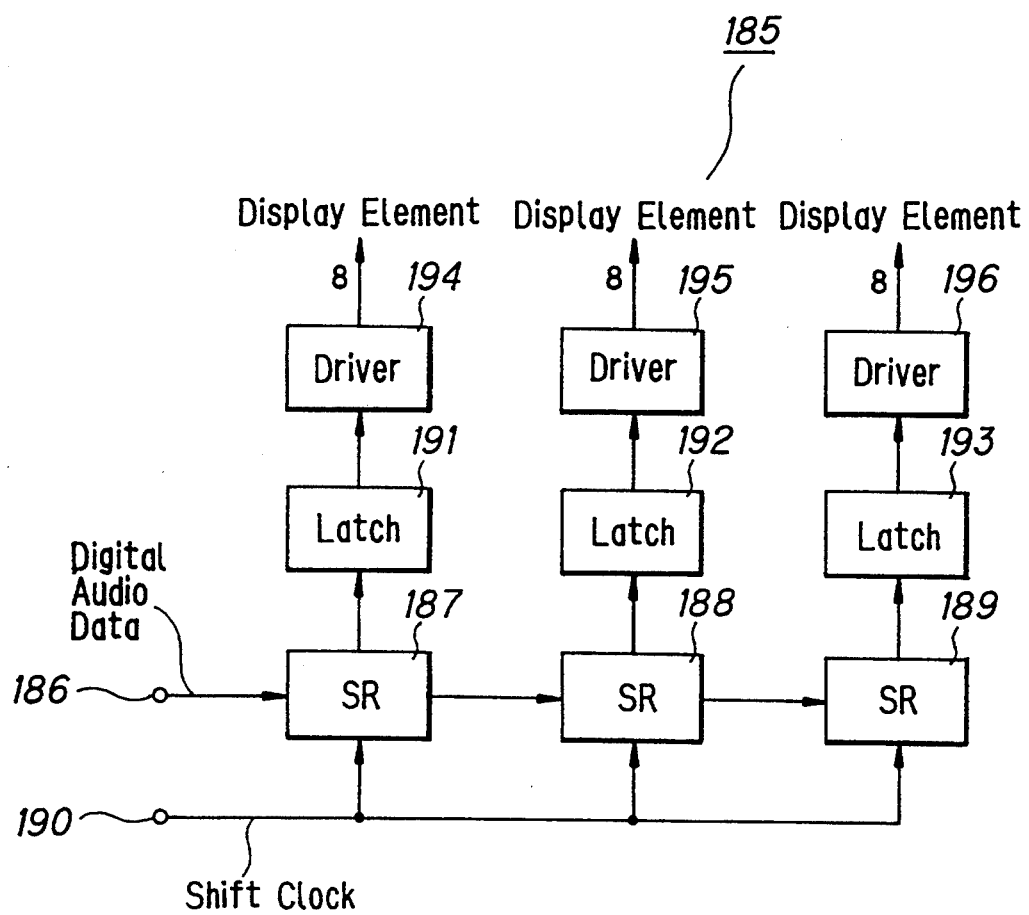
FIG. 16 is a system diagram showing one example of a display element driving circuit for realizing the display of data bits.

FIG. 16 shows a concrete example of a display element driving circuit 185 contained in the display section 153 for indicating the bits.

The waveform data input to a terminal 186 from the RAM for sub-data 113 via the main CPU 400 is supplied to a shift register 187 composed of eight steps and is sequentially shifted bit by bit by a shift clock (bit clock) from a terminal 190. Three shift registers which are cascade-connected are used. The first input bit of the shift register 187 will be the LSB and the final input bit will be the MSB. Bit output of each of the shift registers 187, 188 and 189 are latched concurrently by latch circuits 191, 192 and 193 respectively and supplied to the corresponding display element 181 via drivers 194, 195 and 196. Bits may be displayed corresponding to the input number of bits as shown in FIG. 15 by constructing the driving circuit as described above. Further, such waveform data may be output to an external device.

Returning to FIG. 12, the signal processor 100 will be explained further. Alarm means 154 provided in connection with the main CPU 400 gives an alarm to the user when a data error is brought about due to adhesion of dust and the like during the disc check described later. Details thereof will be explained later.

A ROM 155 stores control programs and the like necessary for performing signal processing. The sub-data information and the like temporary stored in the temporary RAM 113 and the like are finally stored in the RAM 156.

A keyboard 170 is operated by the user and an interface circuit 171 serves as an interface used when communicating with the servo CPU 500.

Figure 17:
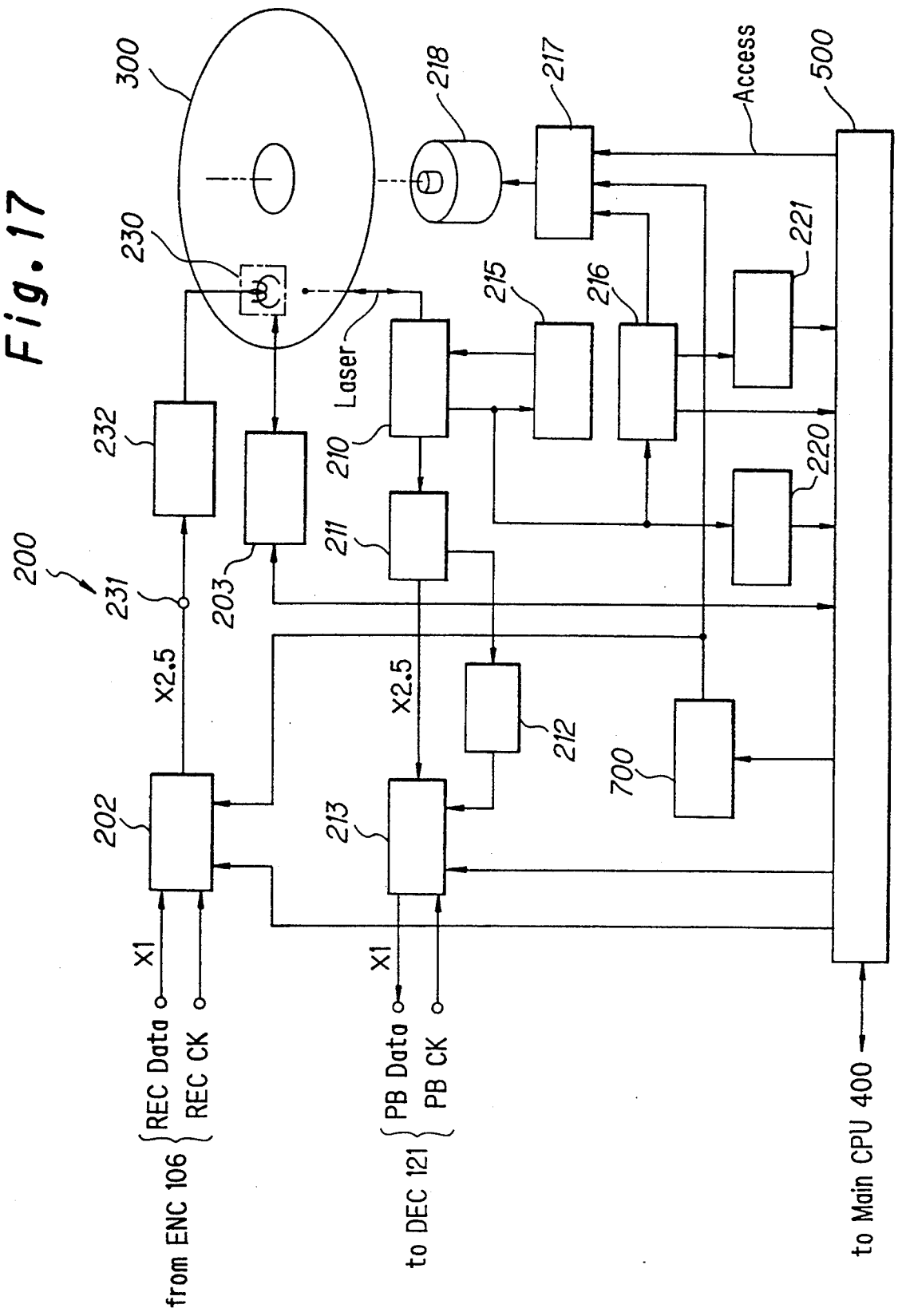
FIG. 17 is a system diagram showing one example of a recording/playback processing section used in the disc recording unit.

FIG. 17 shows a concrete example of the recording/playback processing system 200. The audio data output from the encoder 106 is supplied to a buffer memory 202 arranged in FIFO and when the predetermined number of blocks of audio data are stored, it is read at a faster speed than the writing speed to the buffer memory 202. The reading speed is set to be at least 2.5 times the writing speed which is defined as a standard reference speed. The writing speed is adjusted by adjusting the rotating speed of the disc. It is 2.5 times the speed in the embodiment. That is, the rotating speed of the disc is set to be 2.5 times its normal rotating speed. 3 times the writing speed may be also an adequate value. The disc 300 is accessed at such high speed in order to realize a REC (record) monitor using a single pick-up system as described later.

The audio data read out at 2.5 times speed is supplied to the magnetic head unit 230 via a head driver 232 to be recorded. A gap servo circuit 203 keeps the gap length of the magnetic head unit 230 constant.

The audio data recorded in the disc 300 is read (reproduced) by the light pick-up unit 310. Reading speed at this time is 2.5 times speed, the same as the writing speed. The waveform of the reproduced output is shaped by an equalizer circuit 211 and absolute addresses contained in the reproduced output are supplied to a PLL circuit 212 to generate a reproduction clock.

Based on the reproduction clock, the reproduced output data the waveform of which has been shaped is supplied and stored in a buffer memory 213 arranged in a FIFO format. Data reading speed from the buffer memory 213 is standard speed and data read out is supplied to the decoder 121.

This is for the purpose of realizing the REC monitor and the like by one laser beam as described above to perform such signal processing as writing the audio data output from the signal processor 100 into the disc 300 at 2.5 times transfer speed, reading out at the same speed and returning the speed to the original standard speed when supplying to the signal processor 100.

With reference to timing charts in FIGS. 18A, 18B, 18C and 18D and a flowchart in FIG. 19, the REC monitor will be explained in detail. When the audio data is written into the disc 300 at the writing speed of 2.5 times speed, a read mode starts at a stage where three blocks of audio data are stored in the buffer memory 202 (Step 351). Then, a relationship between a time axis of the original audio data and that of the audio data read from the buffer memory 202 is as shown in FIGS. 18A and 18B and the writing of the three blocks of audio data into the disc 300 is finished with a little over one block of the original audio data (Step 352).

When writing is finished, the light pick-up unit 310 accesses at high speed (seeks at high speed) the head address of the audio data most recently written (Step 353) and immediately after that, the mode is transferred to the read mode (Step 354). Because the reading speed and writing speed are both 2.5 times speed, the reading of three blocks of audio data is finished at the same time as the writing time (FIG. 18C). The read out audio data is written into the buffer memory 213 at the same time (Step 355).

Figure 18:
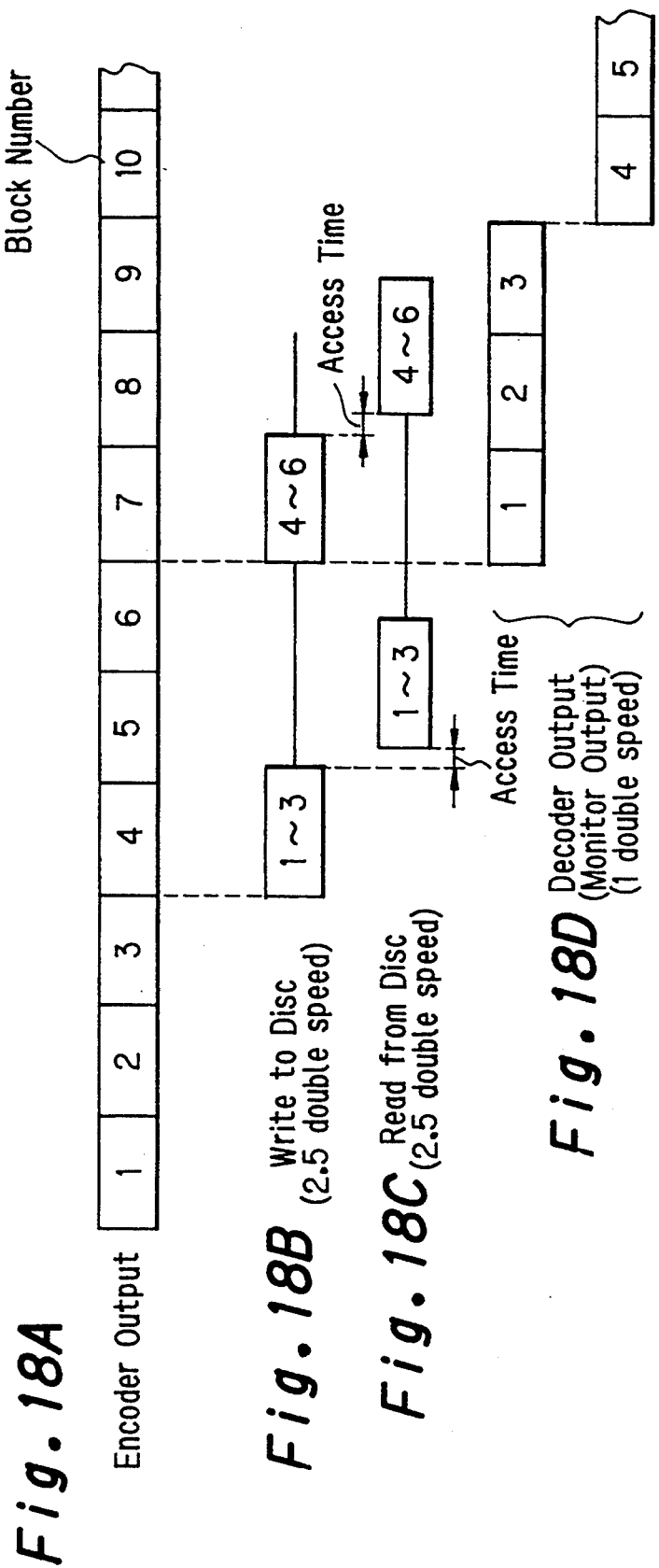
FIGS. 18A through 18D are diagrams for explaining a REC monitor.
Figure 19:
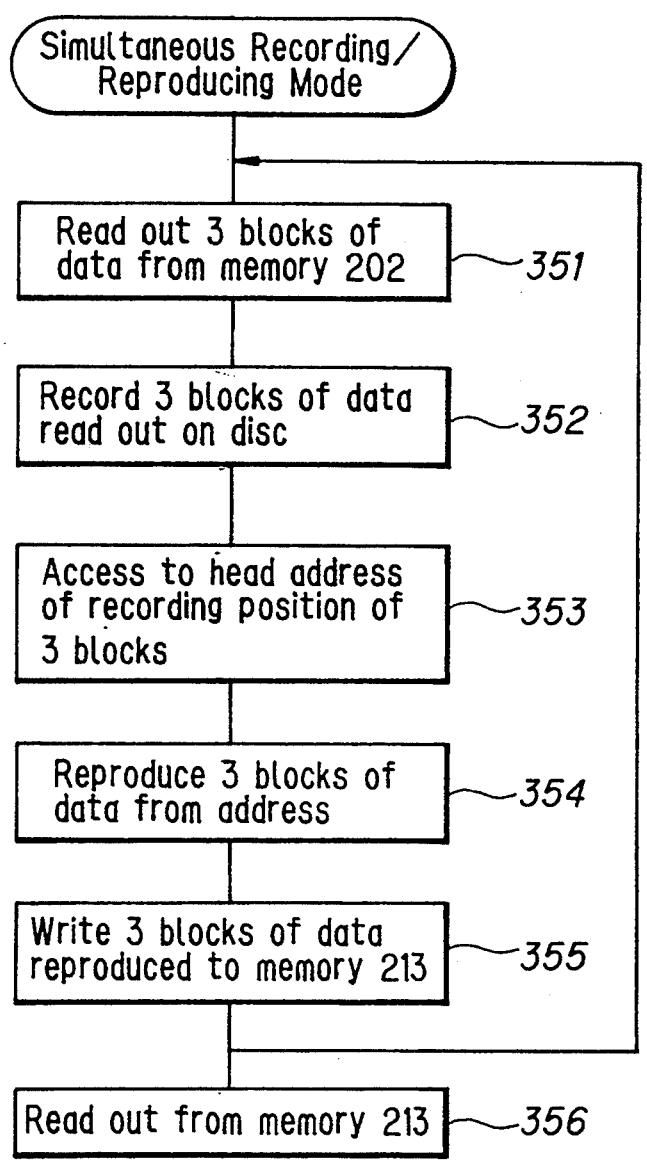
FIG. 19 is a flowchart of the REC monitor.

Because the combined time of the audio data writing time to the disc and reading time from the disc is shorter than the time of the three original blocks, the light pick-up unit 310 may immediately access the rear end data of the audio data most recently written at a stage where the reading of the audio data is finished as shown in FIG. 18B so as to be ready for writing the next audio data (4 through 6 blocks) (Step 352).

On the other hand, because the audio data is read into the buffer memory 213 in a state in which its time axis is returned to the original time axis (Step 356), the audio data just written may be monitored at the same time as the next audio data is written.

Figure 20:
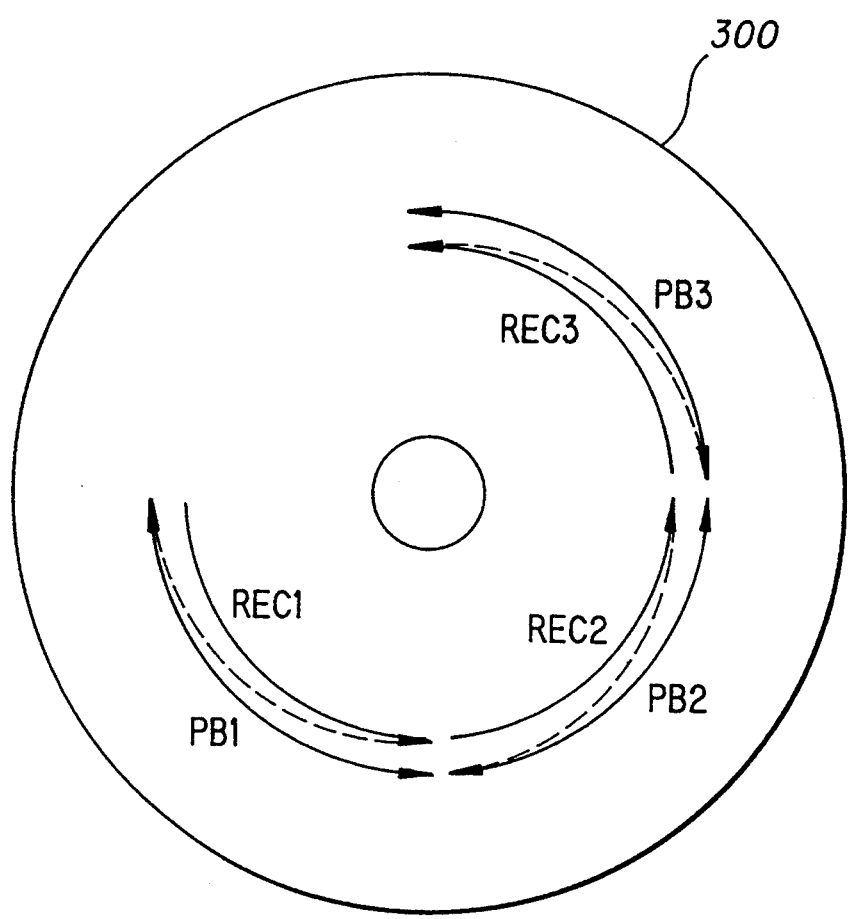
FIG. 20 is a diagram explaining operations of the REC monitor on a disc.

FIG. 20 is a diagram for conceptually explaining the above wherein the audio data writing operation and REC monitor operation are performed concurrently by repeating a the writing process and reading process of the audio data into/from the disc 300.

Returning again to FIG. 17, the recording/play-back processing system 200 will be further explained. The light pick-up unit 310 detects not only signal components but also tracking signals and focus signals. They are supplied to a focus error and tracking error detecting circuit 215 wherein tracking error and focus error are detected independently of each other and those error signals are fed back to a tracking control circuit and focus adjusting circuit (both not shown) provided within the light pick-up unit 310 so that those error signals are zeroed.

The tracking signal is also supplied to an absolute address detecting circuit 216. Because the absolute address is wobbled, the brightness of the laser beam reflected from the disc is modulated by the absolute address. Then the absolute address may be detected from the modulated output. Since the absolute address also signals the rotating speed of the disc 300, a servo circuit 217 of a spindle motor 218 is controlled based thereon to keep the disc rotating speed (e.g. linear velocity CLV) constant.

The absolute address is supplied to the main CPU 400 via the servo CPU 500 to be converted into time code TC of SMPTE and the like. The absolute address is also supplied to an address checking circuit 221 to be used as judgment data for checking disc errors which will be described below.

The disc error check is carried out to prevent from occurring beforehand such trouble as causes an error to be brought about in writing or data being unable to be correctly read due to dust and the like adhering to the disc when in use. The tracking error has to be detected to carry out the disc error check. The reference numeral (220) denotes a tracking error detecting circuit and its output is supplied to the servo CPU 500. Details of the disc error check will be described later.

Figure 21:
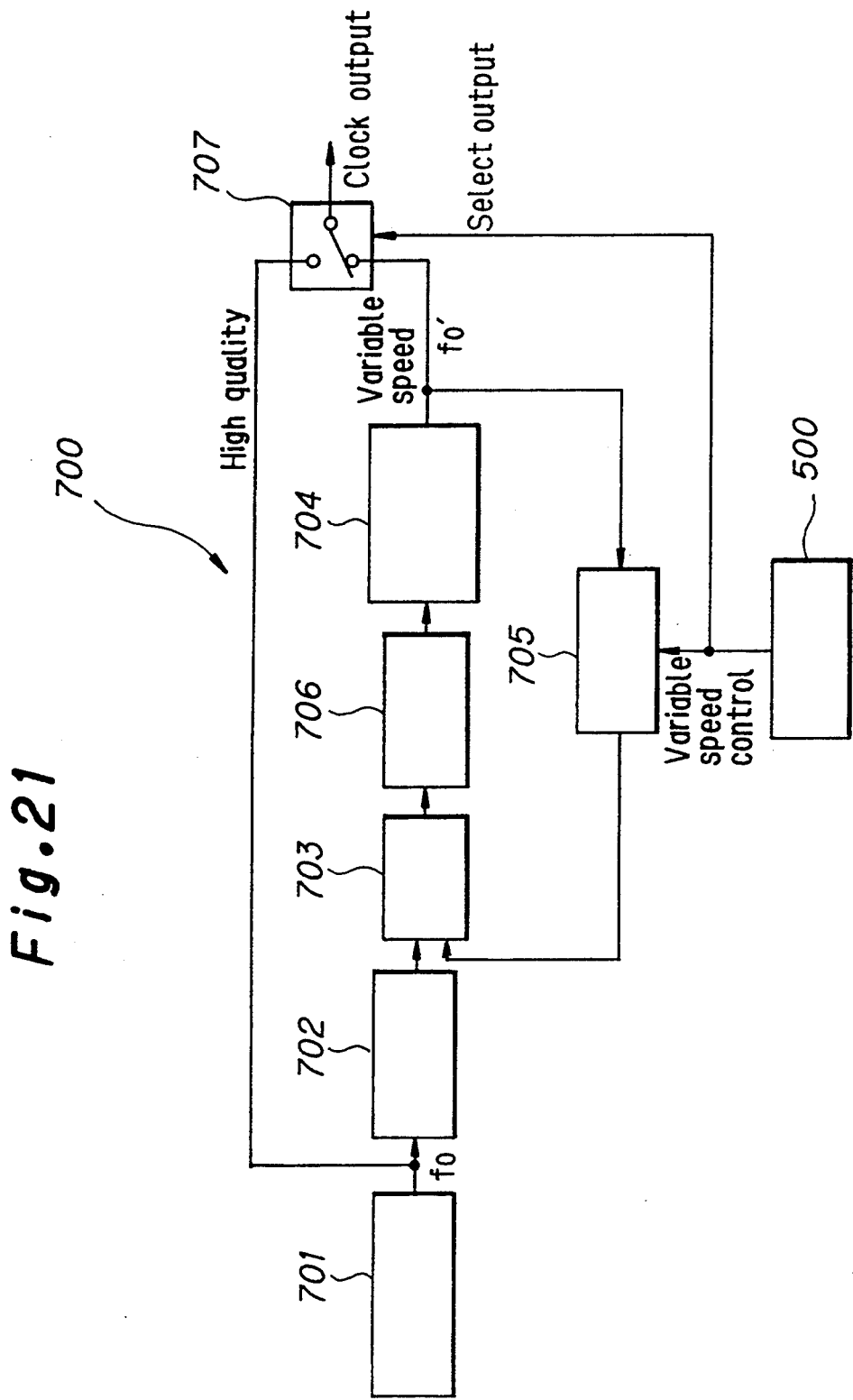
FIG. 21 is a block diagram of a variable oscillating circuit usable as a clock generating circuit.

The reference numeral (700) denotes a variable oscillating circuit used as a clock generating circuit. The clock is supplied to the buffer memory 202 and spindle motor 217 in the recording system as their reference signal. Because the clock frequency used differs depending on the quantized number of bits of audio data and because the audio data needs to be edited while being reproduced at variable speed, the variable oscillating circuit 700 is constructed as shown in FIG. 21.

A quartz oscillator or the like whose oscillating output is stable is used as an oscillating source of a reference quartz oscillator 701. The reference oscillating output is divided into 1/n (n: integer) by a divider 702 and the divided output is supplied to a phase comparator 703. The reference numeral (704) denotes a voltage-controlled oscillator (VCO) using a voltage controlling system or the like. Its output is used as the clock and is supplied to a variable divider 705 to be divided in accordance with a dividing ratio specified by the servo CPU 500.

The divided output is compared with the reference divided output by the phase comparator 703 and the output thereof is supplied to the VCO 704 via a low-pass filter 706 to control PLL so that the VCO 704 oscillates with a clock frequency set by the servo CPU 500. The oscillating output is output via a switch 707.

The oscillating output of the reference oscillator 701 is also supplied to the switch 707 and is used when the VCO 704 is controlled so that it oscillates the reference oscillating output (f0'=f0).

A certain degree of jitter is brought about in the VCO 704 because it is composed of a LC circuit or the like. The jitter leads to the degradation of reproduced sound quality. The reference oscillator 701 produces much less jitter compared to the VCO 704 because a quartz oscillator having high stability is used. Accordingly, the switch 707 is provided in considering that a higher reproduced sound quality may be obtained by using the oscillating output of the reference oscillator 701 when the VCO 704 is controlled to output the reference oscillating frequency. Whether the reference oscillating output is selected or not is controlled by the servo CPU 500 and a switch controlling signal is supplied from the servo CPU 500.

Figure 22:
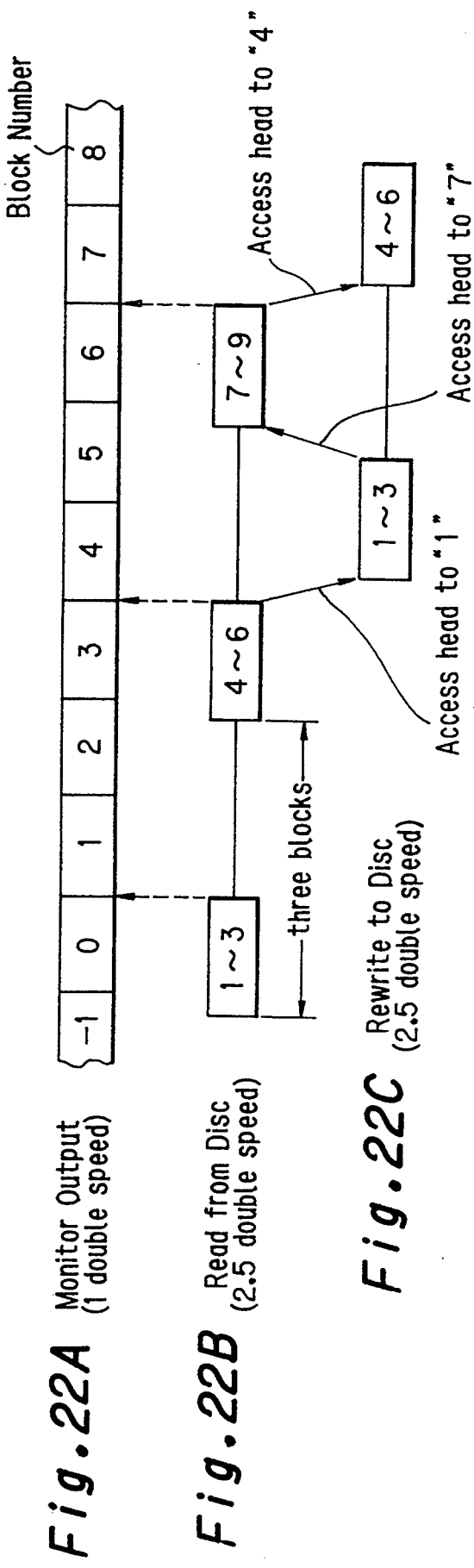
FIGS. 22A through 22C are diagrams for explaining SYNC REC.
Figure 23:
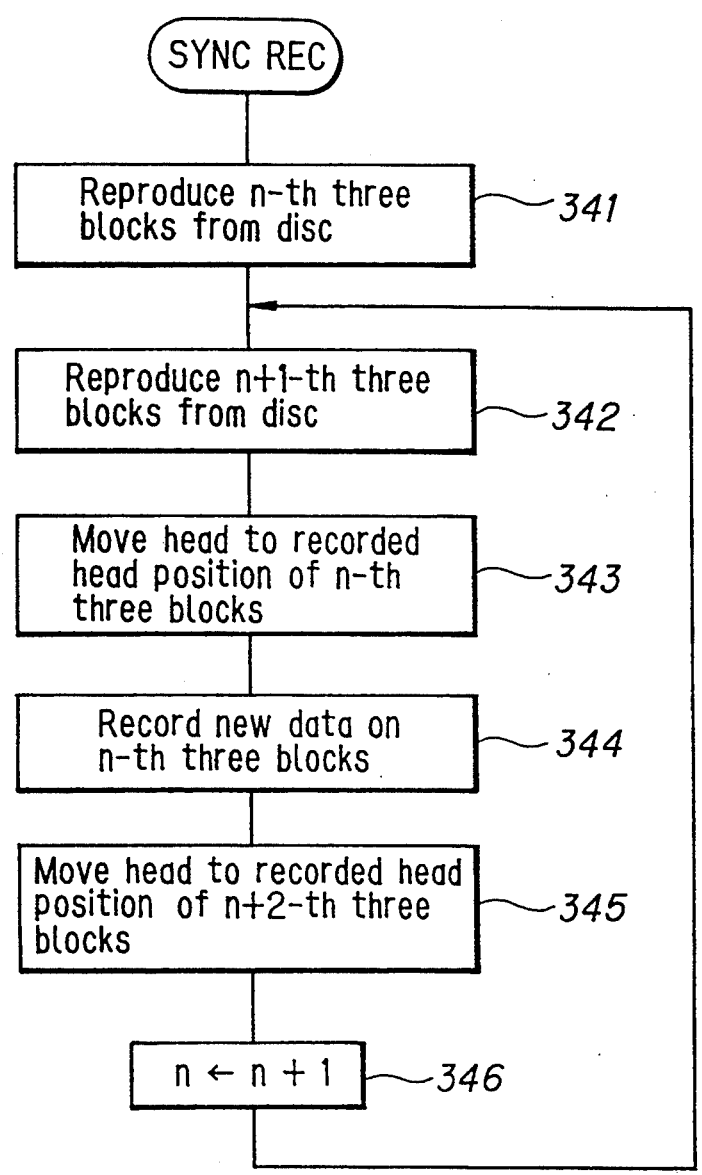
FIG. 23 is a flowchart of the SYNC REC.

FIGS. 22A, 22B and 22C are diagrams for explaining SYNC REC mode. The SYNC REC designates synchronous reproducing and writing (synchronous recording) and this SYNC REC mode is selected when rewriting a part of audio data already recorded in the disc to other audio data or replacing a part of the audio data with other data (audio data indicating zero) to eliminate noise mixed therein.

At first, an operator reads the audio data from the disc 300 once to confirm which part on the disc needs to be rewritten. Then the SYNC REC mode is selected after preparing a new signal to be replaced.

With reference to FIGS. 22A, 22B, and 22C and 23, the SYNC REC will be explained. Firstly, head Nth blocks (1 to 3) and N+1 th blocks (4 to 6) of the blocks to be replaced are reproduced from the disc 300 by the pick-up 210 at 2.5 times speed with the timing shown in FIG. 22B (Steps 341 and 342). The reproduced data is stored in the buffer memory 213 and then read therefrom at standard speed to be output as a monitor output with the timing shown in FIG. 22A. When the N+1th blocks (4 to 6) are reproduced, the light pick-up unit 310 immediately moves to the head position where the Nth blocks (1 to 3) are recorded at high speed (Step 343). The new signal prepared is supplied to the magnetic head unit 230 via the encoder 106, buffer memory 202 and head driver 232, and is newly recorded at the position where the Nth blocks (1 to 3) have been recorded at the timing shown in FIG. 22C. If the data needs to be rewritten further, the light pick-up unit 310 moves to a position where N+2th blocks (7 to 9) are recorded to reproduce the N+2th blocks (7 to 9) (Step 345) and output them as monitor output. After that, the light pick-up unit 310 returns to the recording head position of the previous blocks (4 to 6) to further record a new signal. The new recording signal may be replaced while monitoring reproduced sound by repeating the aforementioned procedure.

Because the writing and reading of the audio data into/from the disc 300 are carried out using the same clock, the SYNC REC operation involved with the synchronous reproducing and writing may be performed with only the single light pick-up unit 310.

The replacing new signal recorded in a recording medium beforehand is reproduced by an external reproducing device and is supplied to the encoder 106 of this apparatus. At this time, the timing of the position and signal to be replaced may be taken using a known phase modifying function. Further, it is possible to supply the new signal to this apparatus so as to record audio data newly played by a player while listening to the reproduced monitor sound, without preparing the new signal beforehand. Further, because the original recorded data is reproduced before rewriting data, the original audio data reproduced from the disc 300 may be supplied to the encoder 106 to be recorded after implementing a desired process of changing sound quality, for example.

Figure 24:
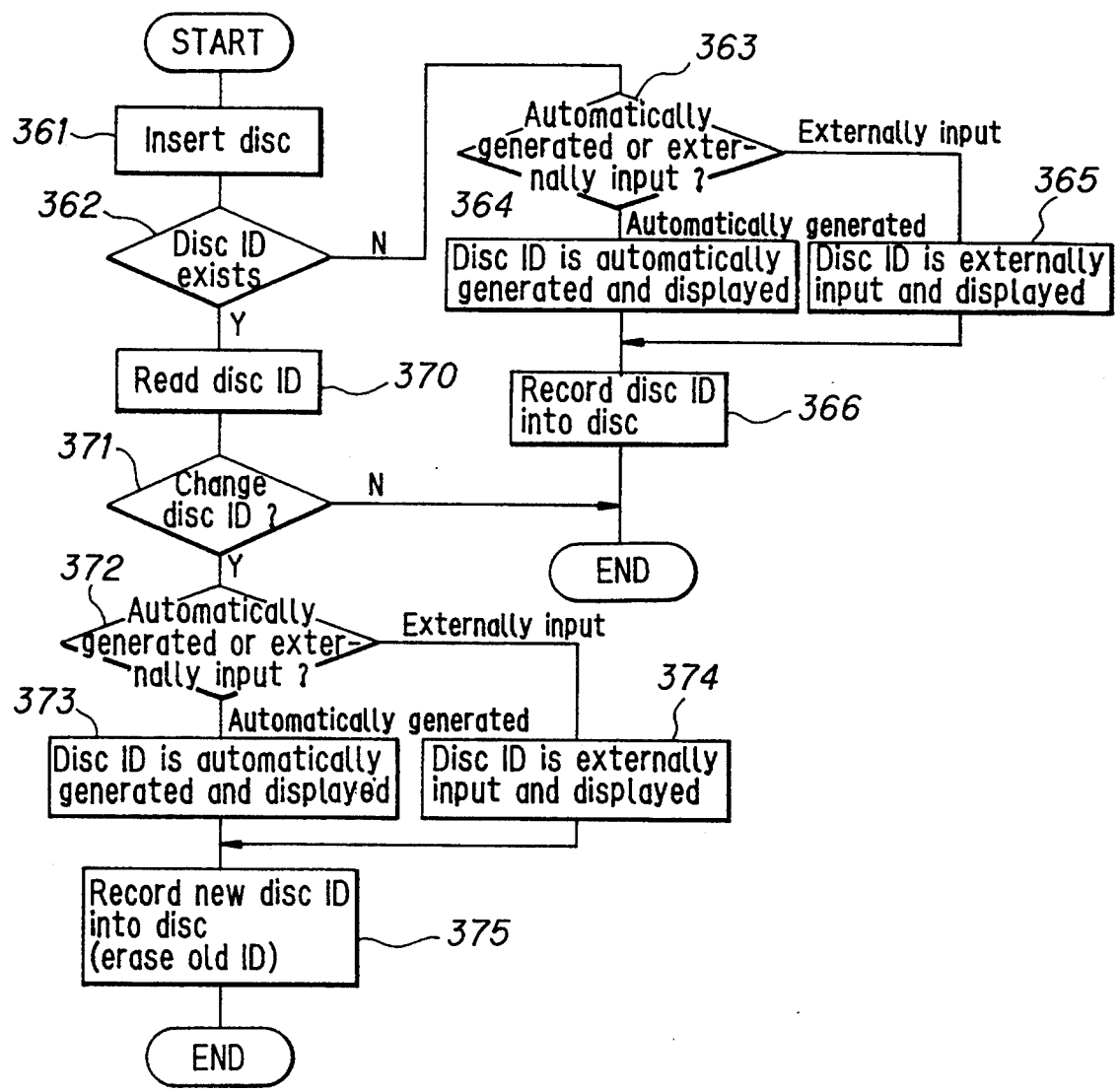
FIG. 24 is a flowchart showing one exemplary process for registering a disc ID.

FIG. 24 is a flowchart showing an exemplary process for registering the disc identification code (disc ID). The disc ID is an identification code unique to the disc using numerals and marks or a combination thereof, and is essential for managing discs. Numerical values in specific digits generated using a table of random numbers may be appropriated within the apparatus when the disc is inserted into the main body of the apparatus, though it may be better to leave the setting of numerical codes to the user in order to improve management by the user. FIG. 24 is a flowchart showing one exemplary process for realizing both. When the disc 300 is inserted into the main body of the apparatus (Step 361), it is checked whether the disc ID has been registered or not (Step 362).

Because the disc ID is recorded in the sub-data area SA, whether the disc ID has been registered or not may be checked by retrieving the data within this area. All the data in the sub-data area SA is read once and stored in the RAM 156.

When the disc ID is not being registered, how to specify a code to be registered is checked (Step 363). When it is automatically set (automatically generated), a unique disc ID is specified from a table of random numbers and is displayed on the display section 153 (Step 364).

When it is to be specified by means of external input, numbers in specific digits are input from the keyboard and are displayed similarly on the display section 153 (Step 365). The automatically set or specified disc ID is registered (recorded) in the sub-data area SA by the user (Step 366) by operating the keyboard.

When the disc ID has been already registered on the disc 300, a process for reading the data is performed (Steps 362 and 370) and it is checked whether the registered disc ID is changed or not in the mode of the next step (Step 371). When it is not changed, the registering process ends as is. When a key-in is made to change it, the same processes in and after Step 363 are carried out (Steps 372, 373, 374 and 375) and the registering process ends.

The timing for writing the disc ID into the disc 300 may be adapted to write it automatically when the disc is ejected, as well as writing it through keys operated by the user as described above. By doing so, a risk of forgetting to write the disc ID and of causing a trouble in the management of discs may be eliminated.

Figure 25:
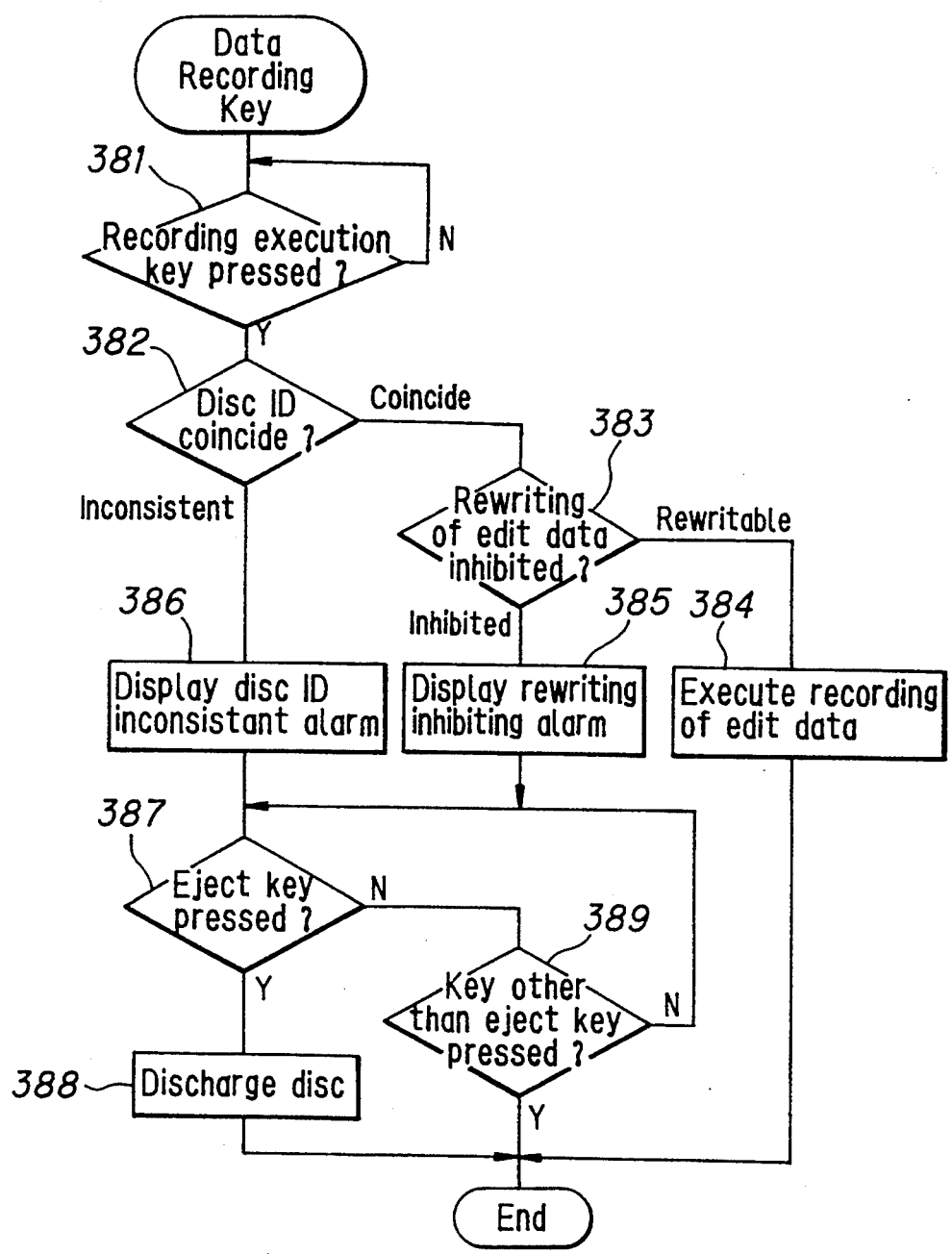

FIG. 25 shows an exemplary process when a protect mode for various information accompanying the main data to be recorded in the sub-data area SA (hereinafter referred to simply as edit data and the like) is adopted.

Various edit data and the like for recording audio data on the disc 300, specifying an address of a cut-out point, and specifying the cross-fade process are written and registered from the RAM 156 of the main body of the apparatus to the sub-data area SA of the disc 300 after finishing the editing operations.

The audio data is read based on the edit data and the like thereafter. When recording the edit data and the like to the sub-data area SA, it is best to inform the operator to prevent an erroneous recording when the disc ID read in the main body of the apparatus and that of the disc 300 to be recorded are different.

FIG. 25 shows one exemplary process for realizing this. When an execution key is pressed to record the edit data and the like (Step 381), the disc ID on the RAM 156 and the disc ID recorded in the disc 300 are collated (Step 382). When they coincide and when the erroneous erase prevention claw 264 is not set at the position in the third step (Step 383), the edit data is recorded as is (Step 384).

Because a protect mode for the sub-data area SA is set when the erroneous erase prevention claw 264 is set at the third step, rewriting is inhibited even if the disc IDs coincide and an alarm is given to the user at this time (Step 385). It is also possible to indicate on the display section 153 that it is in the write protect mode.

Together with an indication that the disc IDs are inconsistent, the alarm is given similarly to the user (Step 386) when the disc IDs do not coincide (Step 382).

After finishing these processes, it is checked whether an eject key is operated or not (Step 387) and the disc 300 is ejected when the key is operated (Step 388). Even if the key is not operated, the disc 300 is ejected similarly when another key is pressed (Step 389), ending the protected recording process of the edit data and the like.

The embodiment in FIG. 25 is a concrete example of the protect mode for the edit data and the like when the execution key is pressed in an arbitrary timing when the editing operation is continued.

Figure 26:
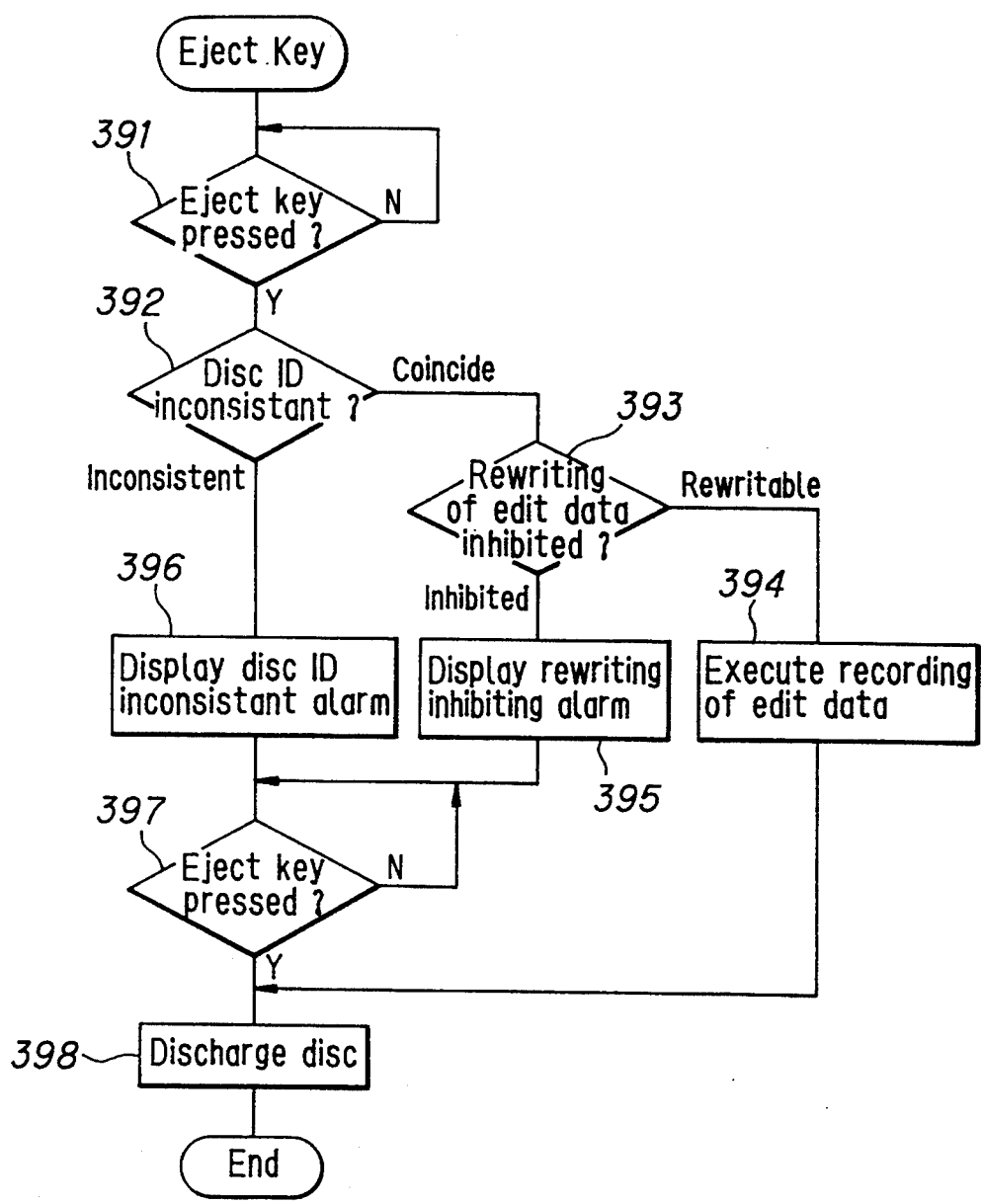

FIG. 26 shows specifically a concrete example of the protect mode for the edit data and the like during the eject mode, regardless of whether the execution key is operated or not. What is different from FIG. 25 is that a step which corresponds to Step 389 does not exist. This is because FIG. 26 shows a control program activated only when the eject key is operated. Therefore, corresponding reference numerals (391 through 398) are used to denote steps that correspond to those in FIG. 25 and an explanation thereof is omitted here.

Due to the protect process shown in FIG. 26, the edit data and the like will not be recorded in a disc unrelated to the edit data nor will the edit data and the like be erased carelessly.

Figures 27, 28:
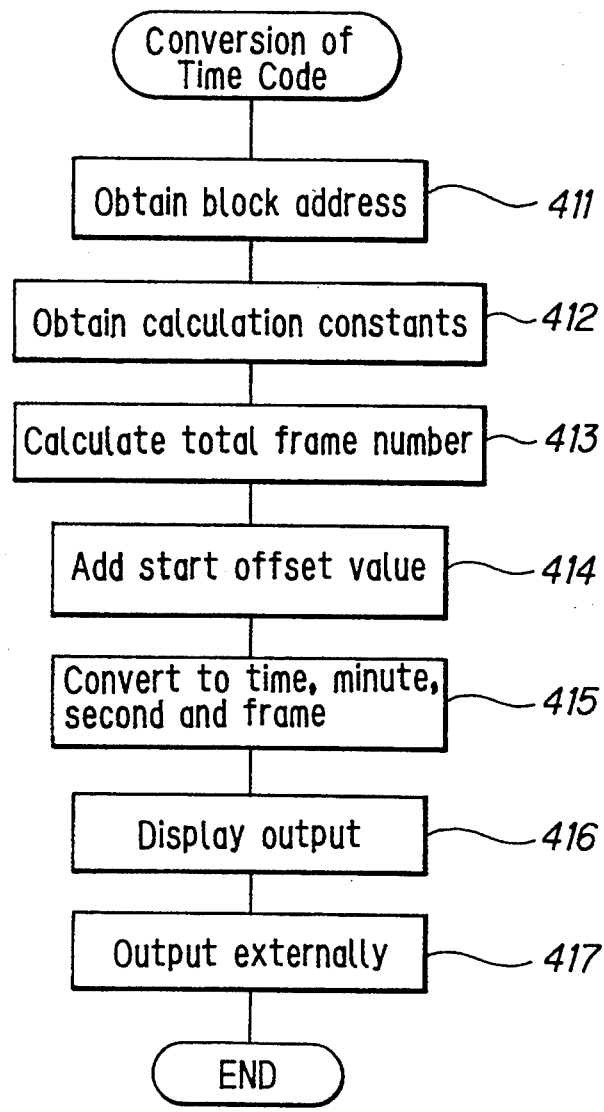
FIG. 27 is a flowchart showing an exemplary process for conversion to time codes.
FIG. 28 is a diagram for explaining the conversion to time codes.

FIG. 27 shows an exemplary process for converting the absolute address into the time code. During editing, it is more convenient, causes less errors and is convenient also when sending out to an external device to manage the absolute address as a time code in units of hour, minute, second and frame rather than as it is.

As described before, the absolute address is FM-modulated and is recorded in the pre-groove 303 on the disc 300. The absolute address may be detected by the address detecting circuit 216 and is transmitted to the main CPU 400 via the servo CPU 500. The main CPU 400 converts the absolute address into the time code in a specified format following the flowchart shown in FIG. 27.

To that end, the absolute address which is a block address is detected at first (Step 411) as shown in FIG. 27 and constants for the conversion such as a word length BLKWD and a time code format data TCWD are set in the next step (Step 412).

Because the word length and time code format information are written in the sub-data area SA, the information remains in the disc 300 even when the power is turned off, exerting no influence on the reproducibility.

The word length BLKWD is a value dependent on the quantized number of bits as shown in FIG. 28. The time code format data TCWD is a value determined by a time code to be converted and sampling frequency as shown in FIG. 29. As the format of the time code, four types of formats (2 types of SMPTE and EBU and FILM) are used in this example as shown in FIG. 29.

The total count of frames TCFRM may be calculated by setting calculation constants following the below expression (Step 413):

$$TCFRM = (BLKADR \times BLKWD)/TCWD$$

where, BLKADR is a present absolute address, BLKWD is the number of words per one block and TCWD is the number of words per one time code frame.

Next, a start offset value of the absolute address TCOFST is added to calculate the final total count of frames TCACT (Step 414).

This total count of frames TCACT is converted into the time codes of hour, minute, second and frame and the converted output is displayed or output to an external device (Steps 415, 416 and 417).

Figure 30:
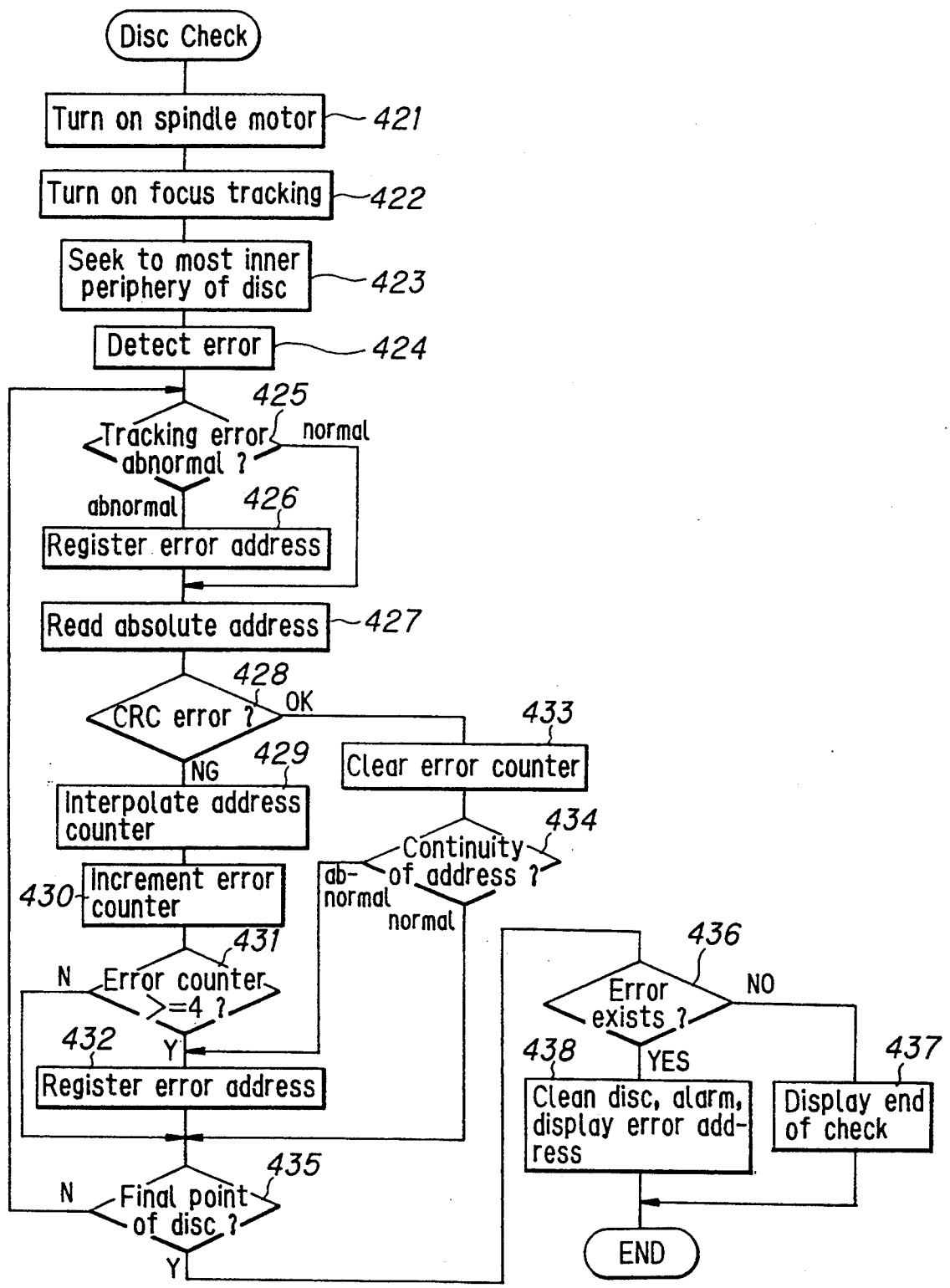
FIG. 30 is a flowchart showing one exemplary process for checking the disc.

FIG. 30 shows one example of a disc error processing flow. Disc error is brought about when data cannot be written or read into/from the disc due to dust and the like adhering to the surface of the disc.

In FIG. 30, this error check program starts when the disc 300 is inserted into the main body of the apparatus. First, the spindle motor is turned on, the focus and tracking operations are turned on and the light pick-up unit 310 is enabled to seek the most inner periphery of the disc (head of the main data area MA) (Steps 421 to 423).

The data is read in this state to detect an error (Step 424). When a tracking error cannot be eliminated even when tracking is controlled in the tracking error detecting circuit 220 shown in FIG. 17, it is judged to be abnormal (Step 425) and the address of the error at that time is registered (Step 426).

The absolute address is read in a next step to check a CRC error (Steps 427 and 428). CRC means an error correcting code. It is checked because when a CRC error exists, an error correcting process cannot be correctly carried out in the encoder 106, degrading the reproduction sound quality.

When the CRC error exists, an address counter (error counter) is interpolated (operated) to increment count values of the error counter (Steps 429 and 430). When the count value (error count value) is more than a specified value ("4" in the present embodiment), its absolute address (error address) is registered (Steps 431 and 432).

When there is no CRC error, the error counter is cleared and continuity of the absolute address is checked next (Steps 433 and 434). When an abnormality is found in the continuity, an address of the error at that time is registered in the same manner as described above (Step 432). After that, similar checking processes are carried out to the final point of the disc similarly to the normal case (Step 435).

When the error check is completed by checking up to the outermost periphery, whether an error exists or not is discriminated. When there is no error, the end of the error check is displayed. When there is an error, the disc 300 is cleaned and at the same time, the alarm is activated and the error address is displayed. Then the error check process is finished (Steps 436 through 438).

Figure 31:
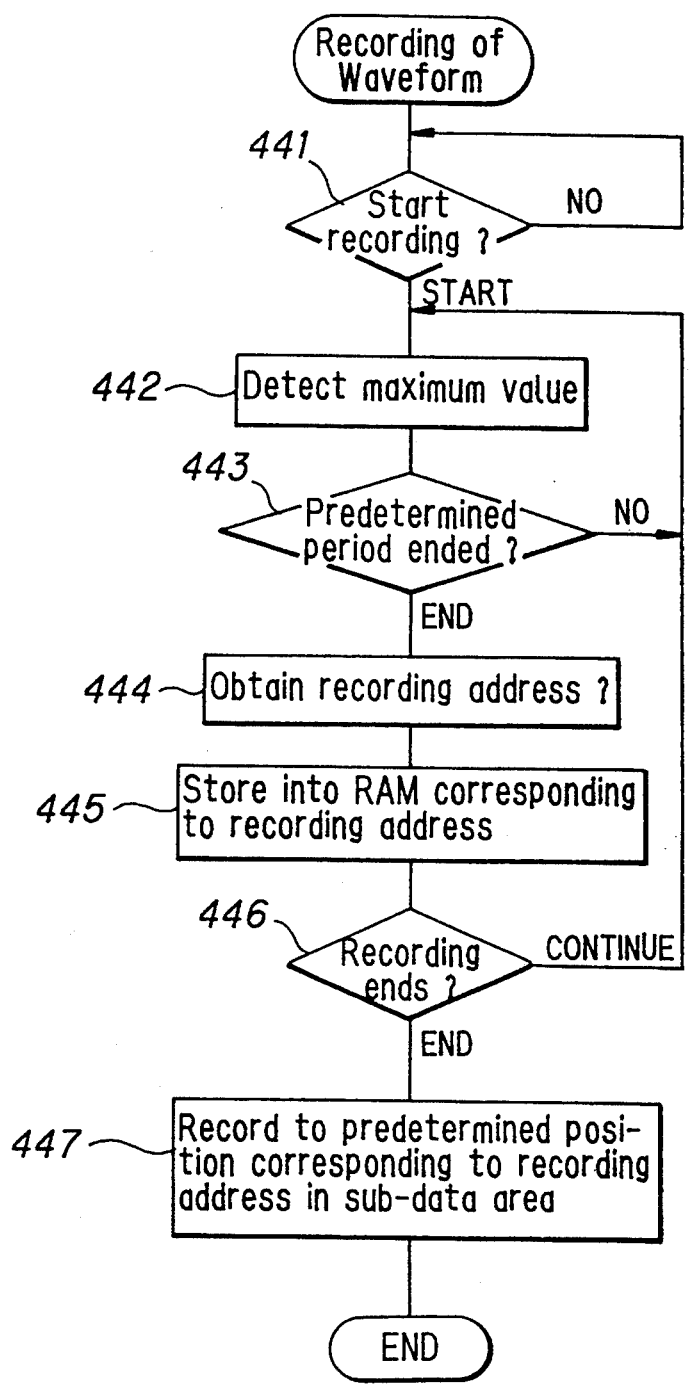
FIG. 31 is a flowchart of a process for recording waveform data.

FIG. 31 is the flow of a process used when recording waveform data. In this example, a sampling for recording waveform data is started at the same time as the start of recording of audio data (Step 441) and a maximum value "max" of the audio data is detected within a predetermined period T (see FIGS. 14A and 14B) (Steps 442 and 443). The recorded address of the audio data that corresponds to the detected maximum value is obtained and the maximum value of the audio data is stored in the RAM 152 corresponding to the recorded address (Steps 444 and 445).

The process of detecting the maximum value and storing the detected maximum value in the RAM 152 is executed until the recording of the audio data ends (Step 446). The waveform data stored in the RAM 152 is stored in the RAM 113 for sub-data and as the recording ends, it is sent to the recording/playback processing system 200 via the encoder 106 and stored in a predetermined position corresponding to the recorded address in the sub-data area SA on the disc 300 by the head 230. Thus, the recording of the waveform data is completed (Step 447).

Because the audio data may be fully compressed if the predetermined period t is set at around 0.1 seconds for example in this waveform data recording process, a rough waveform envelope of the audio data may be obtained by reproducing the waveform data continuously. This is very convenient because it can be utilized for knowing the waveform during editing.

Figure 32:
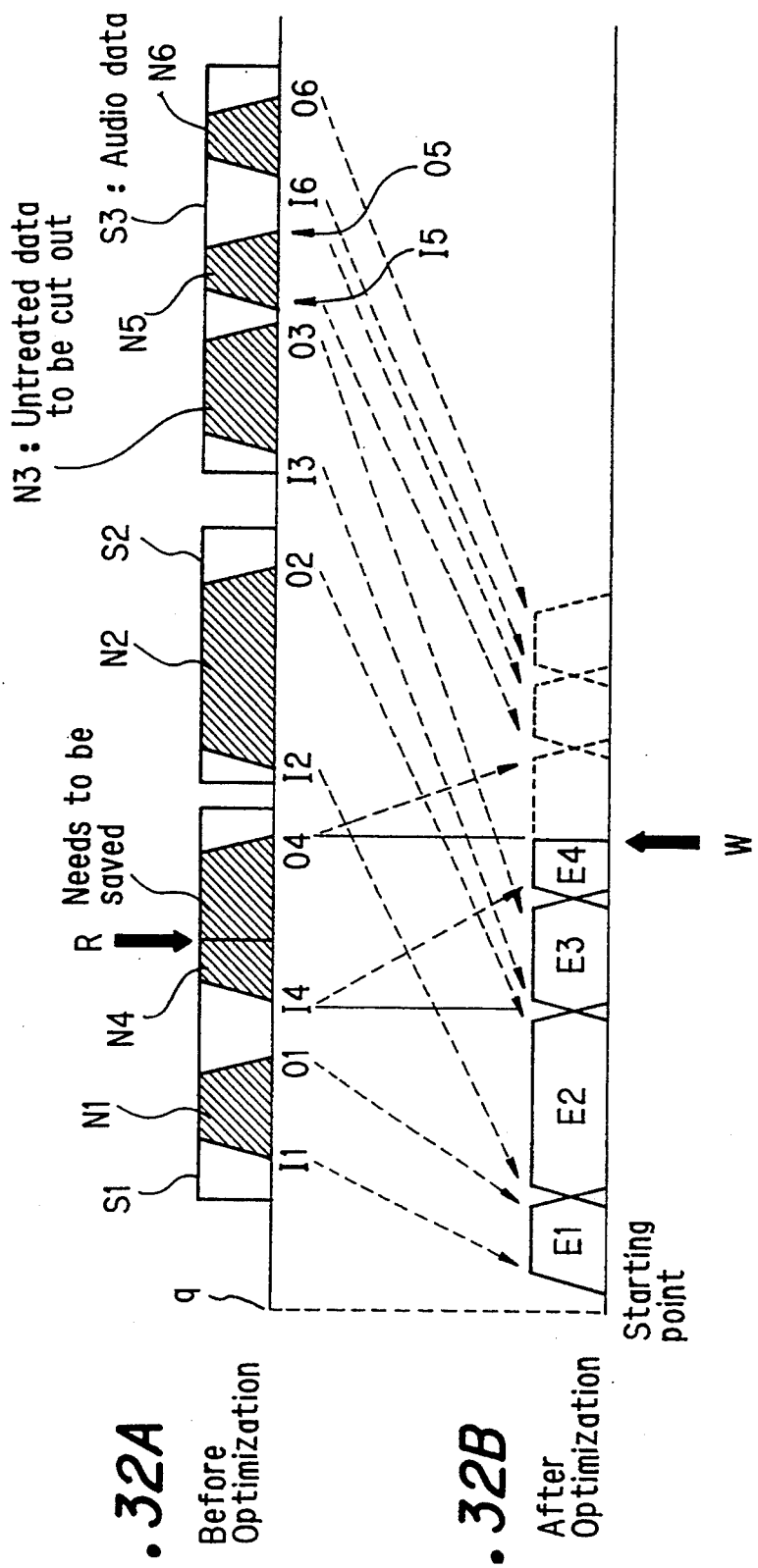
FIGS. 32A and 32B are diagrams for explaining a recorded data optimizing process.

FIGS. 32A and 32B show one example of a data record optimizing process for effectively utilizing the recordable area of the disc. During editing of audio data, it is not always edited using all the audio data recorded in the disc. Normally more audio data than necessary is recorded and necessary takes are cut out therefrom and used. Due to this, much more audio data than that after editing is initially recorded.

In order to effectively utilize the area of the main data area MA into which audio data can be recorded, the area of the audio data which has become unnecessary due to editing should be arranged as an empty area to be able to record new audio data therein.

Such processing will be referred to as an optimizing process hereinafter. Because a data recording area before optimization is used also as a data recording area after optimization in the optimizing process, it is necessary to check whether audio data not used for editing operations exists or not in the data recording area before optimization, before recording data after optimization. Otherwise the audio data after optimization may be overwritten on the recording area of non-used audio data to be used for the optimizing process to be carried out.

Explanation thereof will be made with reference to FIGS. 32A and 32B. In FIG. 32A, Si (i=1, 2, 3, ...) is audio data before optimization and data area Ni shaded is audio data for cut-out (untreated data) used during editing wherein Ii is a cut-out starting point and Oi is a cut-out ending point. It is assumed that the untreated data Ni is edited in the order of less number of i.

In FIG. 32B, Ei indicates an edit data pointer (editing point) and a relationship between the editing point Ei and the starting and ending points of the untreated data Ni may be represented as shown in FIG. 33. In FIGS. 32A and 32B, "W" is a pointer of recording point indicating a data writing point in the editing point E when carrying out the optimizing process. "R" is a read pointer to the untreated data Ni before optimization.

Because the untreated data Ni after optimization is overwritten sequentially on the audio data Si before optimization in the order of less i, the untreated data N1 to be now optimized may be overwritten to the audio data S1 while reading it without destroying it when the starting point of the editing point E1 of the untreated data N1 is a point q before optimization.

The same applies also to an editing point E2. In recording untreated data N3, however, it cannot but be overwritten to untreated data N4 on the audio data S1 (which is untreated data not yet used for the optimizing process). In this case, the untreated data N4 is saved once and then the untreated data N3 is overwritten on the untreated data N4. After overwriting the untreated data N3, the saved untreated data N4 is overwritten on the audio data S1.

Thereafter, the optimizing process is carried out until the final editing point after saving untreated data to be saved. The empty area increases as shown in FIG. 32B when the optimizing process is finished, so that the disc 300 may be more effectively utilized.

Figure 34:
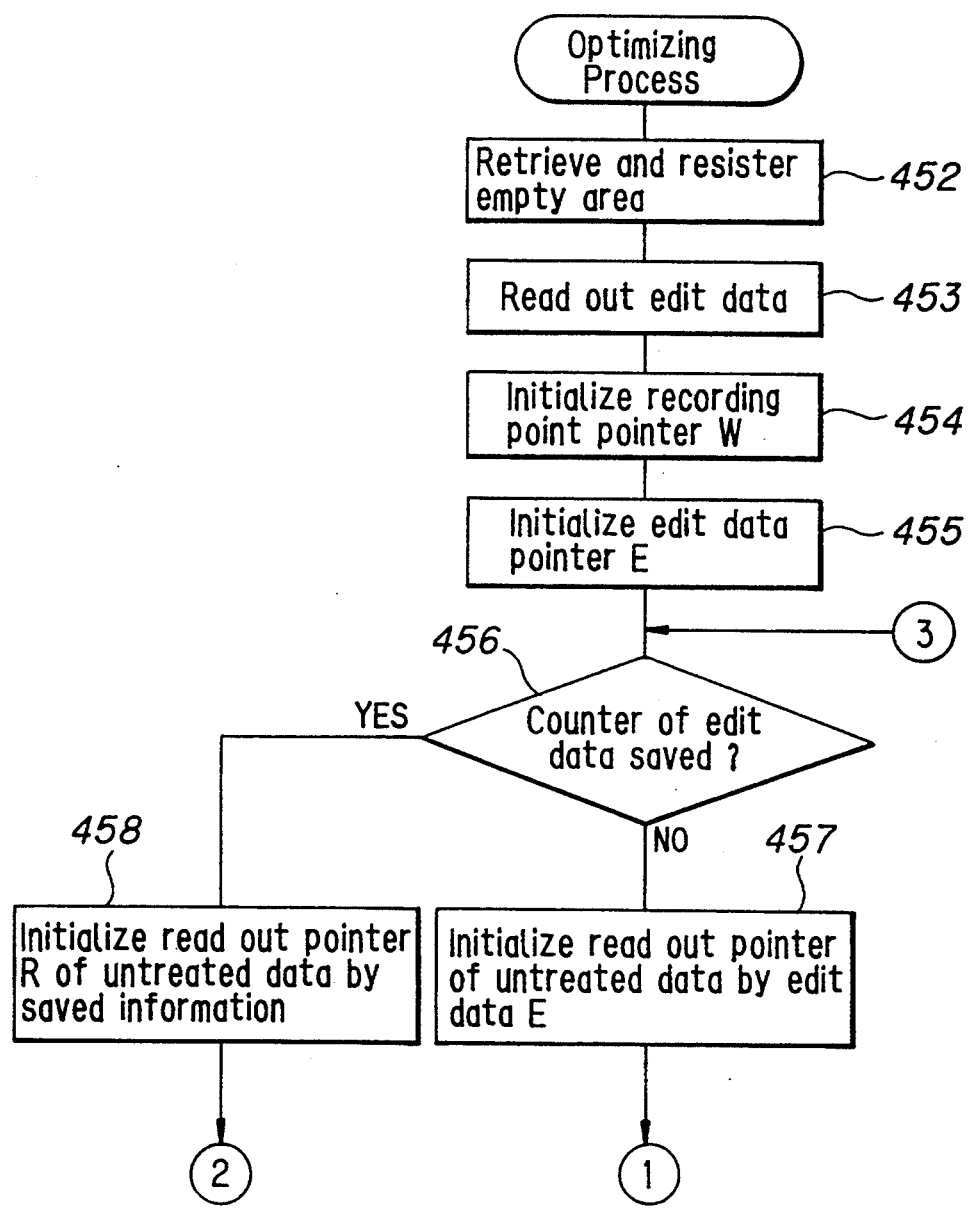
FIG. 34 is a flowchart showing one example of the recorded data optimizing process.
Figure 35:
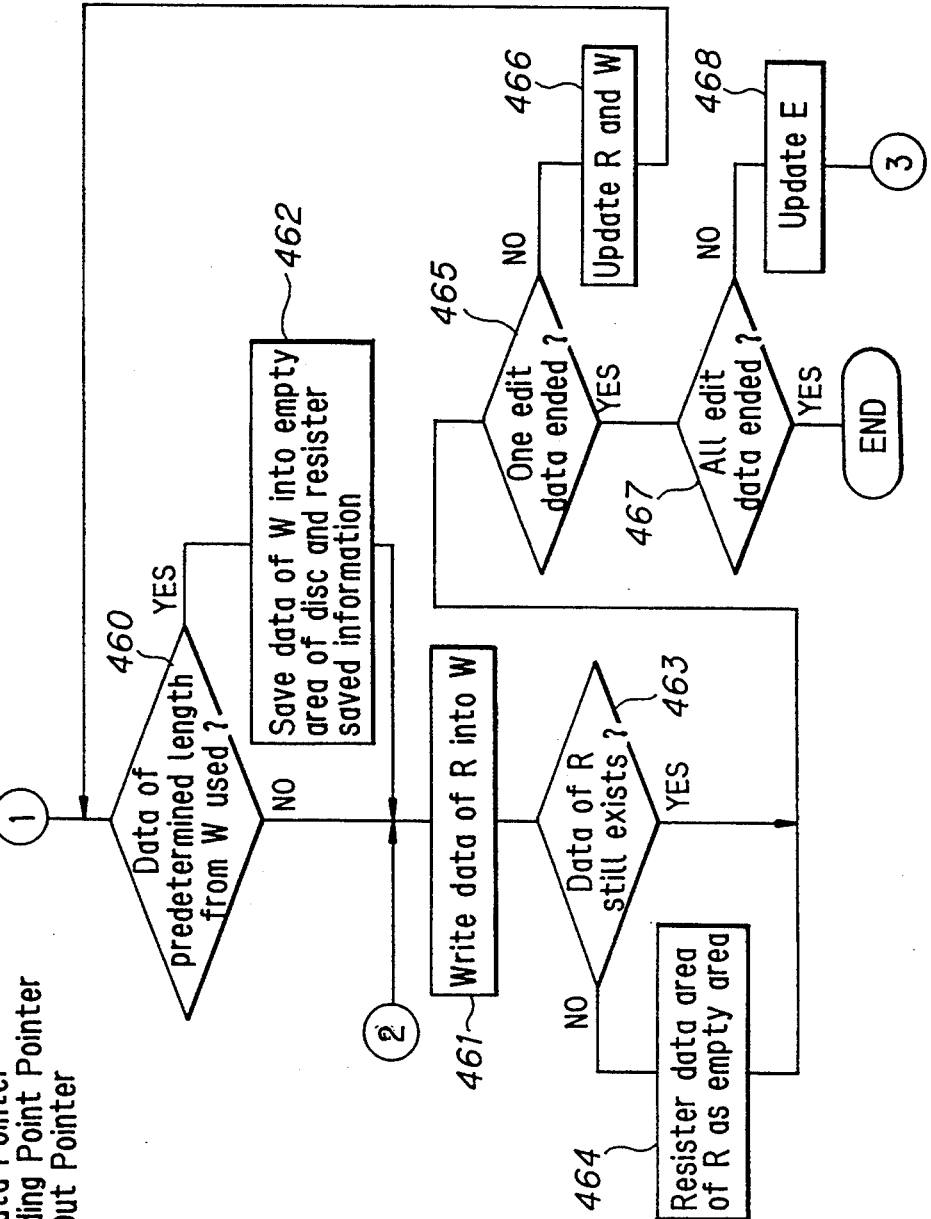
FIG. 35 is flowchart showing another example of the recorded data optimizing process.
Figure 36:
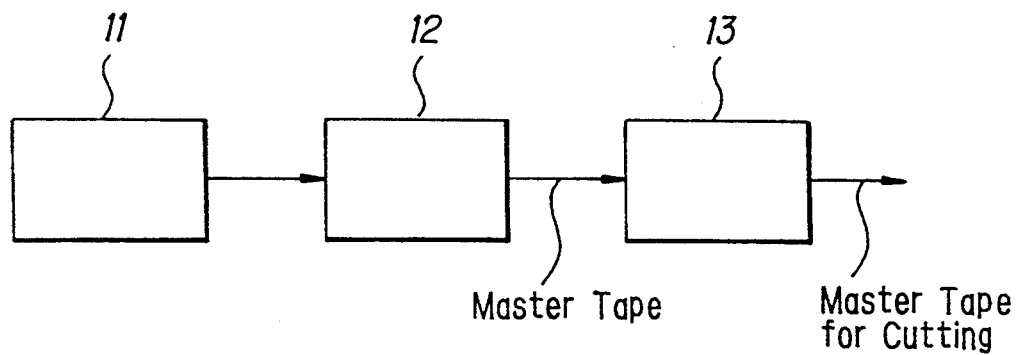
FIG. 36 is a block diagram of a prior art master recording apparatus.

Considering the saving process, the optimizing process as shown in FIGS. 34 and 35 is executed. The processing step continues from FIG. 34 to FIG. 35.

In the process flow shown in FIGS. 34 and 35, because all data recorded in the sub-data area SA are stored once in the RAM 113 or 156 (RAM 156 is used in this embodiment), an empty area and edit data are read while retrieving the data on the RAM 156 to store them again in the RAM 156 (Steps 452 and 453). Thereafter, the recording point pointer W and edit data pointer E are initialized (Steps 454 and 455).

The explanation of each processing step thereafter will be made referring to the concrete example shown in FIGS. 32A and 32B and FIG. 33.

When initialization is completed, it is checked whether the contents of the edit data E (E1) is saved or not (Step 456). Because the edit data E1 is not yet saved, the process moves to Step 457 to initialize a read pointer R of the untreated data N by the edit data E (Step 457). At this time, the read pointer R is initialized so that it comes to the head address of the edit data E1.

Next, when the edit data E1 is not saved, it is checked whether audio data of a certain length from the recording point pointer W is used as edit data thereafter or not (Step 460). Because no untreated data before optimization corresponding to the edit data E1 exists, the audio data from the pointer R is written at a predetermined length from the recording point pointer W (Step 461).

The predetermined length of audio data means the data length determined by the capacity of the temporary RAM 113, for example, which may be one block of edit data (composed of single or a plurality of takes) or shorter.

Next, it is checked whether the audio data of the read pointer R still exists (Step 463). Because one item of edit data E1 cannot be completed when the audio data still exists, R and W are updated respectively to shift to the next pointer at the predetermined length to implement a similar writing process (Steps 465 and 466).

When the audio data is overwritten until the data of the read pointer R no longer exists (Step 463), the data area of the read pointer R is registered as an empty area (Step 464). That is, the area of the untreated data N1 in the audio data S1 is the empty area. New audio data may be then recorded in the empty area.

As the overwriting of E1, which is one item of edit data, is completed, the editing point E is updated (Steps 467 and 468) and E2 becomes the next editing point (see FIG. 33). Because the final position of the editing point E2 overwritten after optimization does not overlap the edit starting point I4 before optimization, the untreated data N2 is overwritten on the area of the audio data S1 before optimization through the same steps as those of the edit data E1. Then the editing point E is updated to E3.

While the saved content does not exist even at the editing point E3 (Step 456), the audio data of predetermined length from the recording point pointer W in the new editing point E3 (which corresponds to the untreated data N4) is data to be used as edit data but not yet used for actual editing.

In this case, the process moves to Step 462 to save the untreated data N4 from the recording point pointer W in the empty area on the disc 300. At the same time, the saved information is registered in the RAM 156.

Then, the untreated data N3 which corresponds to the editing point E3 set in Step 457 is overwritten from the recording point pointer W (at the head address of the editing point E3). As the untreated data N3 is overwritten at the position of the untreated data N4 before optimization in relation to the editing point E3, the editing point E is again updated to E4.

Then, because it is found that the edit data E4 is saved in Step 456, the process moves to Step 458 this time to initialize the read pointer R related to the untreated data N4 by using the save information described above, or to change to the head address of the editing point E4. After that, the saved untreated data N4 is overwritten from the recording point pointer R (Step 461).

Although a part of the untreated data N4 for the optimization overlaps a part of the untreated data N2 at this time in FIGS. 32A and 32B, it causes no trouble in the overwriting process related to the untreated data N4 because the data area of the untreated data N2 has been already registered as an empty area (Step 464).

The optimizing process as described above is carried out sequentially to the final edit data while accompanying the saving process (Step 467) and is completed by finishing all of the edit data.

While the present invention has been specifically shown and described with reference to a preferred embodiment thereof, it will be understood by those skilled in the art that the aforegoing and other changes in form and details can be made therein without departing from the spirit and scope of the present invention.

What is claimed is:

1. An apparatus for recording data, comprising:
   receiving means for receiving digital audio signal input data, wherein said digital audio signal input data includes a series of digital values which represent the amplitude of an audio signal plotted over time;
   detecting means for detecting a maximum value of said digital audio signal input data that is received by said receiving means during a predetermined time period, such that after a plurality of said predetermined time periods have elapsed, said detecting means has detected a plurality of maximum values, wherein each of said plurality of maximum values corresponds to one of said plurality of predetermined time periods;
   memory means for temporarily storing said plurality of maximum values; and
   recording means for recording said digital audio signal input data and said plurality of maximum values retrieved from said memory means on a disc recording medium.

2. The apparatus according to claim 1, wherein said disc recording medium has a first recording area for recording said digital audio signal input data and a second recording area for recording said plurality of maximum values.

3. The apparatus according to claim 1, further comprising:
   display means connected to said memory means so as to receive said maximum value corresponding to said predetermined time period for displaying said maximum value corresponding to said predetermined time period.

4. The apparatus according to claim 3, wherein said display means includes a predetermined number of display elements, such that said predetermined number of display elements equals a number of bits used to encode said digital audio signal input data, and wherein each of said display elements corresponds to one bit used to encode said plurality of maximum values.

5. The apparatus according to claim 1, further comprising:
   reproducing means for reproducing said plurality of maximum values from said disc recording medium; and
   means for supplying said plurality of maximum values to said memory means to store therein.

6. A method of recording data, comprising the steps of:
   receiving digital audio signal input data, wherein said digital audio signal input data includes a series of digital values which represent the amplitude of an audio signal plotted over time;
   detecting a maximum value of said digital audio signal input data that is received in said receiving step during a predetermined time period, such that after a plurality of said predetermined time periods have elapsed, said detecting step has detected a plurality of maximum values, wherein each of said plurality of maximum values corresponds to one of said plurality of predetermined time periods;
   temporarily storing said plurality of maximum values in a memory; and
   recording said digital audio signal input data and said plurality of maximum values retrieved from said memory on a disc recording medium.

7. The method according to claim 6, wherein said disc recording medium has a first recording area for recording said digital audio signal input data and a second recording area for recording said plurality of maximum values.

8. The method according to claim 6, further comprising the step of:
   displaying said maximum value corresponding to said predetermined time period.

9. The method according to claim 8, wherein said displaying step utilizes a predetermined number of display elements, such that said predetermined number of display elements equals a number of bits used to encode said digital audio signal input data, and wherein each of said display elements corresponds to one bit used to encode said plurality of maximum values.

10. The method according to claim 6, further comprising the step of:
reproducing said plurality of maximum values from said disc recording medium; and
supplying said plurality of maximum values to said memory to store therein.

* * * * *